(12) United States Patent
Abedini et al.

(10) Patent No.: US 11,638,194 B2
(45) Date of Patent: Apr. 25, 2023

(54) MOBILITY-AWARE ACCESS CONTROL

(71) Applicant: QUALCOMM Incorporated, San Diego, CA (US)

(72) Inventors: Navid Abedini, Somerset, NJ (US); Jianghong Luo, Skillman, NJ (US); Karl Georg Hampel, Hoboken, NJ (US); Luca Blessent, Whitehouse Station, NJ (US); Tao Luo, San Diego, CA (US); Junyi Li, Chester, NJ (US); Wanshi Chen, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/986,766

(22) Filed: Aug. 6, 2020

(65) Prior Publication Data

US 2021/0051558 A1     Feb. 18, 2021

Related U.S. Application Data

(60) Provisional application No. 62/989,106, filed on Mar. 13, 2020, provisional application No. 62/888,270, filed on Aug. 16, 2019.

(51) Int. Cl.
*H04W 36/32* (2009.01)
*H04W 36/00* (2009.01)
(Continued)

(52) U.S. Cl.
CPC ............. *H04W 36/32* (2013.01); *H04W 8/02* (2013.01); *H04W 36/0011* (2013.01);
(Continued)

(58) Field of Classification Search
CPC ... H04W 84/005; H04W 48/20; H04W 88/08; H04W 36/011; H04W 36/0058;
(Continued)

(56) References Cited

U.S. PATENT DOCUMENTS

2012/0172045 A1* 7/2012 Fukuta .................. H04W 36/32
                                                           455/440
2015/0334614 A1  11/2015 Banks et al.
(Continued)

FOREIGN PATENT DOCUMENTS

WO    2015017165 A1    2/2015
WO    2015156497 A1   10/2015
(Continued)

OTHER PUBLICATIONS

Huawei: "Topology Discovery and Update for IAB", 3GPP Draft, 3GPP TSG-RAN WG3 Meeting AH-1807, R3-183821 Topology Discovery and Update for IAB, 3rd Generation Partnership Project (3GPP), Mobile Competence Centre, 650, Route Des Lucioles, F-06921 Sophia-Antipolis Cedex, France, vol. RAN WG3, No. Montreal, Canada; May 2, 2018-May 6, 2018 Jul. 1, 2018, XP051468105, Retrieved from the Internet: URL:http://www.3gpp.org/ftp/Meetings%5F3GPP%5FSYNC/RAN3/Docs/ [retrieved on Jul. 1, 2018], sections 2.1 and 2.2, 2 pages.
(Continued)

*Primary Examiner* — Quoc Thai N Vu
(74) *Attorney, Agent, or Firm* — Shumaker & Sieffert, P. A.

(57) ABSTRACT

Certain aspects of the present disclosure provide techniques for mobility-aware access control. A method that may be performed by a first wireless device generally includes receiving one or more signals from a second wireless device in the network, wherein the one or more signals provide an indication of a mobility state corresponding to the second wireless device; determining whether to establish a connection with the second wireless device based, at least in part, on the indication of the mobility state corresponding to the second wireless device; and taking one or more actions
(Continued)

based on the determination. Other aspects, embodiments, and features are also claimed and described.

23 Claims, 16 Drawing Sheets

(51) Int. Cl.
    *H04W 36/04*     (2009.01)
    *H04W 8/02*     (2009.01)
    *H04W 74/08*     (2009.01)
    *H04W 76/10*     (2018.01)

(52) U.S. Cl.
    CPC ....... *H04W 36/0058* (2018.08); *H04W 36/04* (2013.01); *H04W 74/0833* (2013.01); *H04W 76/10* (2018.02)

(58) Field of Classification Search
    CPC ................. H04W 36/04; H04W 36/32; H04W 36/00837; H04W 36/0085; H04W 36/08; H04W 36/34; H04W 48/18; H04W 76/10; H04B 7/15507; H04B 7/15528
    See application file for complete search history.

(56) References Cited

U.S. PATENT DOCUMENTS

2016/0302142 A1* 10/2016 Bengtsson .............. H04W 4/06
2020/0389832 A1* 12/2020 Otaka ................... H04W 36/34

FOREIGN PATENT DOCUMENTS

WO      2019048135 A1      3/2019
WO      2019161989 A1      8/2019

OTHER PUBLICATIONS

International Search Report and Written Opinion—PCT/US2020/045363—ISA/EPO—dated Nov. 9, 2020.

* cited by examiner

MOBILITY-AWARE ACCESS CONTROL

CROSS-REFERENCE TO RELATED APPLICATIONS

This application claims benefit of and priority to U.S. Provisional Application Nos. 62/888,270 and 62/989,106, filed Aug. 16, 2019 and Mar. 13, 2020, respectively, which are hereby assigned to the assignee hereof and hereby expressly incorporated by reference herein in their entireties as if fully set forth below and for all applicable purposes.

FIELD OF THE DISCLOSURE

Aspects of the present disclosure relate to wireless communications, and more particularly, to techniques for mobility-aware access control. Some aspects and techniques can be used to enhance mobility-based communication, initial network access, cell (re)selection, and/or handover procedures when communication components/devices initial communications move about or within a communications network.

INTRODUCTION

Wireless communication systems are widely deployed to provide various telecommunication services such as telephony, video, data, messaging, broadcasts, etc. These wireless communication systems may employ multiple-access technologies capable of supporting communication with multiple users by sharing available system resources (e.g., bandwidth, transmit power, etc.). Examples of such multiple-access systems include 3rd Generation Partnership Project (3GPP) Long Term Evolution (LTE) systems, LTE Advanced (LTE-A) systems, code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems, to name a few.

These multiple access technologies have been adopted in various telecommunication standards to provide a common protocol that enables different wireless devices to communicate on a municipal, national, regional, and even global level. New radio (e.g., 5G NR) is an example of an emerging telecommunication standard. NR is a set of enhancements to the LTE mobile standard promulgated by 3GPP. NR is designed to better support mobile broadband Internet access by improving spectral efficiency, lowering costs, improving services, making use of new spectrum, and better integrating with other open standards using OFDMA with a cyclic prefix (CP) on the downlink (DL) and on the uplink (UL). To these ends, NR supports beamforming, multiple-input multiple-output (MIMO) antenna technology, and carrier aggregation.

As demand for mobile broadband access continues to increase, there exists a need for further improvements in NR and LTE technology. Preferably, these improvements should be applicable to other multi-access technologies and the telecommunication standards that employ these technologies.

SUMMARY

The systems, methods, and devices of the disclosure each have several aspects, no single one of which is solely responsible for its desirable attributes. Without limiting the scope of this disclosure as expressed by the claims which follow, some features will now be discussed briefly. After considering this discussion, and particularly after reading the section entitled "Detailed Description" one will understand how the features of this disclosure provide advantages that include improved mobility-aware access control.

Various aspects or embodiments include a variety of mobility-awareness features. In some scenarios, these may be utilized in conjunction with and/or for communications in a variety of network arrangements. For example, a radio access network may include a wireless backhaul network, sometimes referred to as an integrated access and backhaul (IAB) network. In an IAB network, at least one base station acts as an anchor base station (also referred to as an IAB donor) that communicates with a core network (via a wired backhaul link). The IAB network may include one or more non-anchor base stations (also referred to as IAB nodes), that may communicate directly with or indirectly with (for example, via one or more other non-anchor base stations) the anchor base station via one or more wireless backhaul links to form a backhaul path to the core network.

TAB networks and communication devices in general, according to some aspects, may include a variety of features related to mobility. For example, in a typical TAB network, TAB nodes (for example, non-anchor base stations) are stationary (that is, non-moving). Conversely, in a mobile IAB network, some of the IAB nodes may have mobility capabilities (that is, they may move around in the IAB network). Such IAB nodes may be referred to as mobile IAB nodes. For example, a mobile IAB node may be installed on a vehicle (for example, a bus, a train, a taxi) and/or many other items capable of movement. In a mobile IAB network, there may be a mix of stationary and mobile IAB nodes.

According to some aspects, components or nodes in a network (e.g., an IAB network) may have a variety of operational states (e.g., a mobility state). A mobility state of a given IAB node can impact operation of the mobile IAB network. For example, the performance of a number of IAB network-related operations may depend on the mobility states of mobile IAB nodes. Such IAB network-related operations may include, for example, IAB topology and resource management, local scheduling, beam management, beam tracking, synchronization tracking, positioning, quality of service (QoS) type support identification, access, and paging, among other examples. Thus, knowledge of the mobility state of a given IAB node may be desirable to facilitate efficient and acceptable performance of the mobile IAB network.

Certain aspects provide a method for wireless communication by a network node in a network. The method generally includes obtaining at least one of first mobility state information corresponding to a first cell, second mobility state information corresponding to a second cell, or third mobility state information corresponding to a wireless device in the network. The method may also include receiving a measurement report from the UE. In some cases, the measurement report may include measurement information associated with the second cell. The method may also include determining whether to initiate a handover procedure to hand over the wireless device from the first cell to the second cell. In some cases, the determination of whether to initiate the handover procedure may be based at least in part on at least one of the first mobility state information, the second mobility state information, or the third mobility state information. Additionally, in some cases, the method may also include taking one or more actions based on the determination.

Certain aspects provide an apparatus for wireless communication by a network node in a network. The apparatus generally includes at least one processor configured to obtain at least one of first mobility state information corresponding to a first cell, second mobility state information corresponding to a second cell, or third mobility state information corresponding to a wireless device in the network. Additionally, in some cases, the at least one processor may also be configured to receive a measurement report from the UE. The measurement report may, in some cases, include measurement information associated with the second cell. Additionally, in some cases, the at least one processor may further be configured to determine whether to initiate a handover procedure to hand over the wireless device from the first cell to the second cell. In some cases, the determination of whether to initiate the handover procedure may be based at least in part on at least one of the first mobility state information, the second mobility state information, or the third mobility state information. Additionally, in some cases, the at least one processor may further be configured to take one or more actions based on the determination. The apparatus may also include a memory coupled with the at least one processor.

Certain aspects provide an apparatus for wireless communication by a network node in a network. The apparatus generally includes means for obtaining at least one of first mobility state information corresponding to a first cell, second mobility state information corresponding to a second cell, or third mobility state information corresponding to a wireless device in the network. Additionally, in some cases, the apparatus may also include means for receiving a measurement report from the UE. The measurement report, in some cases, may include measurement information associated with the second cell. Additionally, in some cases, the apparatus may also include means for determining whether to initiate a handover procedure to hand over the wireless device from the first cell to the second cell. In some cases, the determination of whether to initiate the handover procedure may be based at least in part on at least one of the first mobility state information, the second mobility state information, or the third mobility state information. Additionally, in some cases, the apparatus may also include means for taking one or more actions based on the determination.

Certain aspects provide a non-transitory computer-readable medium for wireless communication by a network node in a network. The non-transitory computer-readable medium generally includes instructions that, when executed by at least one processor, cause the at least one processor to obtain at least one of first mobility state information corresponding to a first cell, second mobility state information corresponding to a second cell, or third mobility state information corresponding to a wireless device in the network. Additionally, in some cases, the non-transitory computer-readable medium may further include instructions that cause the least one processor to receive a measurement report from the UE. The measurement report, in some cases, may include measurement information associated with the second cell. Additionally, in some cases, the non-transitory computer-readable medium may further include instructions that cause the least one processor to determine whether to initiate a handover procedure to hand over the wireless device from the first cell to the second cell. In some cases, the determination of whether to initiate the handover procedure may be based at least in part on at least one of the first mobility state information, the second mobility state information, or the third mobility state information. Additionally, in some cases, the non-transitory computer-readable medium may further include instructions that cause the least one processor to take one or more actions based on the determination.

Certain aspects provide a method for wireless communication by a first wireless device in a network. The method generally includes receiving one or more signals from a second wireless device in the network. The one or more signals, in some cases, may provide an indication of a mobility state corresponding to the second wireless device. Additionally, in some cases, the method may also include determining whether to establish a connection with the second wireless device. The determination of whether to establish the connection with the second wireless device may, in some cases, be based, at least in part, on the indication of the mobility state corresponding to the second wireless device. Additionally, in some cases, the method may also include taking one or more actions based on the determination.

Certain aspects provide an apparatus for wireless communication by a first wireless device in a network. The apparatus generally includes at least one processor configured to receive one or more signals from a second wireless device in the network. The one or more signals may, in some cases, provide an indication of a mobility state corresponding to the second wireless device. Additionally, in some cases, the at least one processor may be further configured to determine whether to establish a connection with the second wireless device. The determination of whether to establish the connection with the second wireless device may, in some cases, be based, at least in part, on the indication of the mobility state corresponding to the second wireless device. Additionally, in some cases, the at least one processor may be further configured to take one or more actions based on the determination. The apparatus also generally includes a memory coupled with the at least one processor.

Certain aspects provide an apparatus for wireless communication by a first wireless device in a network. The apparatus generally includes means for receiving one or more signals from a second wireless device in the network. The one or more signals may, in some cases, provide an indication of a mobility state corresponding to the second wireless device. Additionally, in some cases, the apparatus may be further include means for determining whether to establish a connection with the second wireless device. The determination of whether to establish the connection with the second wireless device may, in some cases, be based, at least in part, on the indication of the mobility state corresponding to the second wireless device. Additionally, in some cases, the apparatus may be further include means for taking one or more actions based on the determination.

Certain aspects provide a non-transitory computer-readable medium for wireless communication by a first wireless device in a network. The non-transitory computer-readable medium generally includes instructions that, when executed by at least one processor, cause the at least one processor to receive one or more signals from a second wireless device in the network. The one or more signals may, in some cases, provide an indication of a mobility state corresponding to the second wireless device. Additionally, in some cases, the non-transitory computer-readable medium may further include instructions that cause the least one processor to determine whether to establish a connection with the second wireless device. The determination of whether to establish the connection with the second wireless device may, in some cases, be based, at least in part, on the indication of the mobility state corresponding to the second wireless device. Additionally, in some cases, the non-transitory computer-readable medium may further include instructions that cause the least one processor to take one or more actions based on the determination.

Certain aspects provide a method for wireless communication by a first wireless device in a network. The method generally includes camping on a first cell in the network. Additionally, in some cases, the method may also include receiving one or more signals from a second cell in the network. Additionally, in some cases, the method may also include determining mobility state information corresponding to the second cell in the network. In some cases, determining the mobility state information corresponding to the second cell may be based at least in part on the one or more signals. Additionally, in some cases, the method may also include transmitting a measurement report to a network node. In some cases, transmitting the measurement report to the network node may be based, at least in part, on the one or more signals from the second cell and the mobility state information corresponding to the second cell.

Certain aspects provide an apparatus for wireless communication by a first wireless device in a network. The apparatus generally includes at least one processor configured to camp on a first cell in the network. Additionally, in some cases, the at least one processor may be further configured to receive one or more signals from a second cell in the network. Additionally, in some cases, the at least one processor may be further configured to determine mobility state information corresponding to the second cell in the network. In some cases, determining the mobility state information corresponding to the second cell may be based at least in part on the one or more signals. Additionally, in some cases, the at least one processor may be further configured to transmit a measurement report to a network node. In some cases, transmitting the measurement report to the network node may be based, at least in part, on the one or more signals from the second cell and the mobility state information corresponding to the second cell. Additionally, in some cases, the apparatus may also include a memory coupled with the at least one processor.

Certain aspects provide an apparatus for wireless communication by a first wireless device in a network. The apparatus generally includes means for camping on a first cell in the network. Additionally, in some cases, the apparatus may be further include means for receiving one or more signals from a second cell in the network. Additionally, in some cases, the apparatus may be further include means for determining mobility state information corresponding to the second cell in the network. In some cases, determining the mobility state information corresponding to the second cell may be based at least in part on the one or more signals. Additionally, in some cases, the apparatus may be further include means for transmitting a measurement report to a network node. In some cases, transmitting the measurement report to the network node may be based, at least in part, on the one or more signals from the second cell and the mobility state information corresponding to the second cell.

Certain aspects provide a non-transitory computer-readable medium for wireless communication by a first wireless device in a network. The non-transitory computer-readable medium generally includes instructions that, when executed by at least one processor, cause the at least one processor to camp on a first cell in the network. Additionally, in some cases, the non-transitory computer-readable medium may further include instructions that cause the least one processor to receive one or more signals from a second cell in the network. Additionally, in some cases, the non-transitory computer-readable medium may further include instructions that cause the least one processor to determine mobility state information corresponding to the second cell in the network. In some cases, determining the mobility state information corresponding to the second cell may be based at least in part on the one or more signals. Additionally, in some cases, the non-transitory computer-readable medium may further include instructions that cause the least one processor to transmit a measurement report to a network node. In some cases, transmitting the measurement report to the network node may be based, at least in part, on the one or more signals from the second cell and the mobility state information corresponding to the second cell.

Certain aspects provide a method for wireless communication by a network node in a network. The method generally includes receiving a measurement report from a wireless device that is camping on a first cell in the network. In some cases, the measurement report may be based on one or more signals from a second cell in the network. Additionally, in some cases, the method may further include determining whether to initiate a handover procedure to hand the wireless device over to the second cell. In some cases, the determination of whether to initiate the handover procedure may be based, at least in part, on mobility state information corresponding to the second cell. Additionally, in some cases, the method may further include taking one or more actions based on the determination.

Certain aspects provide an apparatus for wireless communication by a network node in a network. The apparatus generally includes at least one processor configured to receive a measurement report from a wireless device that is camping on a first cell in the network. In some cases, the measurement report may be based on one or more signals from a second cell in the network. Additionally, in some cases, the at least one processor may be further configured to determine whether to initiate a handover procedure to hand the wireless device over to the second cell. In some cases, the determination of whether to initiate the handover procedure may be based, at least in part, on mobility state information corresponding to the second cell. Additionally, in some cases, the at least one processor may be further configured to take one or more actions based on the determination. The apparatus also generally includes a memory coupled with the at least one processor.

Certain aspects provide an apparatus for wireless communication by a network node in a network. The apparatus generally includes means for receiving a measurement report from a wireless device that is camping on a first cell in the network. In some cases, the measurement report may be based on one or more signals from a second cell in the network. Additionally, in some cases, the apparatus may be further include means for determining whether to initiate a handover procedure to hand the wireless device over to the second cell. In some cases, the determination of whether to initiate the handover procedure may be based, at least in part, on mobility state information corresponding to the second cell. Additionally, in some cases, the apparatus may be further include means for taking one or more actions based on the determination.

Certain aspects provide a non-transitory computer-readable medium for wireless communication by a network node in a network. The non-transitory computer-readable medium generally includes instructions that, when executed by at least one processor, cause the at least one processor to receive a measurement report from a wireless device that is camping on a first cell in the network. In some cases, the measurement report may be based on one or more signals from a second cell in the network. Additionally, in some cases, the non-transitory computer-readable medium may further include instructions that cause the least one processor to determine whether to initiate a handover procedure to hand the wireless device over to the second cell. In some cases, the determination of whether to initiate the handover procedure may be based, at least in part, on mobility state information corresponding to the second cell. Additionally, in some cases, the non-transitory computer-readable medium may further include instructions that cause the least one processor to take one or more actions based on the determination.

Certain aspects provide a method for wireless communication by a first wireless device in a network. The method generally includes camping on a first cell in the network. Additionally, in some cases, the method may further include receiving a conditional handover command from a network node in the network to hand over to a second cell in the network. In some cases, the conditional handover command includes one or more conditions. Additionally, in some cases, the one or more conditions may be based, at least in part, on a mobility state corresponding to the second cell. Additionally, in some cases, the method may further include taking one or more actions based, at least in part, on the conditional handover command.

Certain aspects provide an apparatus for wireless communication by a first wireless device in a network. The apparatus generally includes at least one processor configured to camp on a first cell in the network. Additionally, in some cases, the at least one processor may be further configured to receive a conditional handover command from a network node in the network to hand over to a second cell in the network. In some cases, the conditional handover command includes one or more conditions. Additionally in some cases, the one or more conditions may be based, at least in part, on a mobility state corresponding to the second cell. Additionally, in some cases, the at least one processor may be further configured to take one or more actions based, at least in part, on the conditional handover command. Additionally, in some cases, the apparatus may also include a memory coupled with the at least one processor.

Certain aspects provide an apparatus for wireless communication by a first wireless device in a network. The apparatus generally includes means for camping on a first cell in the network. Additionally, in some cases, the apparatus may be further include means for receiving a conditional handover command from a network node in the network to hand over to a second cell in the network. In some cases, the conditional handover command includes one or more conditions. Additionally, in some cases, the one or more conditions may be based, at least in part, on a mobility state corresponding to the second cell. Additionally, in some cases, the apparatus may be further include means for taking one or more actions based, at least in part, on the conditional handover command.

Certain aspects provide a non-transitory computer-readable medium for wireless communication by a first wireless device in a network. The non-transitory computer-readable medium generally includes instructions that, when executed by at least one processor, cause the at least one processor to camp on a first cell in the network. Additionally, in some cases, the non-transitory computer-readable medium may further include instructions that cause the least one processor to receive a conditional handover command from a network node in the network to hand over to a second cell in the network. In some cases, the conditional handover command includes one or more conditions. Additionally, in some cases, the one or more conditions may be based, at least in part, on a mobility state corresponding to the second cell. Additionally, in some cases, the non-transitory computer-readable medium may further include instructions that cause the least one processor to take one or more actions based, at least in part, on the conditional handover command.

Certain aspects provide a method for wireless communication by a network node in a network. The method generally includes communicating with a wireless device in the network that is camping on a first cell in the network. Additionally, in some cases, the method may further include transmitting a conditional handover command from a network node in the network to hand over to a second cell in the network. In some cases, the conditional handover command includes one or more conditions. Additionally, in some cases, the one or more conditions may be based, at least in part, on a mobility state corresponding to the second network.

Certain aspects provide an apparatus for wireless communication by a network node in a network. The apparatus generally includes at least one processor configured to communicate with a wireless device in the network that is camping on a first cell in the network. Additionally, in some cases, the at least one processor may be further configured to transmit a conditional handover command from a network node in the network to hand over to a second cell in the network. In some cases, the conditional handover command includes one or more conditions. Additionally, in some cases, the one or more conditions may be based, at least in part, on a mobility state corresponding to the second network. Additionally, in some cases, the apparatus may also include a memory coupled with the at least one processor.

Certain aspects provide an apparatus for wireless communication by a network node in a network. The apparatus generally includes means for communicating with a wireless device in the network that is camping on a first cell in the network. Additionally, in some cases, the apparatus may be further include means for transmitting a conditional handover command from a network node in the network to hand over to a second cell in the network. In some cases, the conditional handover command includes one or more conditions. Additionally, in some cases, the one or more conditions may be based, at least in part, on a mobility state corresponding to the second network.

Certain aspects provide a non-transitory computer-readable medium for wireless communication by a network node in a network. The non-transitory computer-readable medium generally includes instructions that, when executed by at least one processor, cause the at least one processor to communicate with a wireless device in the network that is camping on a first cell in the network. Additionally, in some cases, the non-transitory computer-readable medium may further include instructions that cause the least one processor to transmit a conditional handover command from a network node in the network to hand over to a second cell in the network. In some cases, the conditional handover command includes one or more conditions. Additionally, in some cases, the one or more conditions may be based, at least in part, on a mobility state corresponding to the second network.

To the accomplishment of the foregoing and related ends, the one or more aspects comprise the features hereinafter fully described and particularly pointed out in the claims. The following description and the appended drawings set forth in detail certain illustrative features of the one or more aspects. These features are indicative, however, of but a few of the various ways in which the principles of various aspects may be employed.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the drawings. It is to be noted, however, that the appended drawings illustrate only certain typical aspects of this disclosure and are therefore not to be considered limiting of its scope, for the description may admit to other equally effective aspects.

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Aspects of the present disclosure provide apparatus, methods, processing systems, and computer readable mediums for mobility-aware access control. For example, a mobility state of an integrated access and backhaul (IAB) node may impact operation of a mobile IAB network. For example, the performance of a number of IAB network-related operations may depend on the mobility state of a mobile IAB node. Such IAB network-related operations may include, for example, initial cell access, cell selection/reselection, and cell handover. Thus, given the mobility state of a mobile IAB node/cell, the mobile IAB node may or may not be the best choice for a serving cell of a user equipment (UE) or a mobile termination component (MT). Thus, knowledge of a mobility state of a given IAB node may be desirable to facilitate the cell selection/access/handover operations described above for efficient and acceptable performance of the mobile IAB network.

The following description provides examples of mobility-aware access control in communication systems, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method which is practiced using other structure, functionality, or structure and functionality in addition to, or other than, the various aspects of the disclosure set forth herein. It should be understood that any aspect of the disclosure disclosed herein may be embodied by one or more elements of a claim. The word "exemplary" is used herein to mean "serving as an example, instance, or illustration." Any aspect described herein as "exemplary" is not necessarily to be construed as preferred or advantageous over other aspects.

In general, any number of wireless networks may be deployed in a given geographic area. Each wireless network may support a particular radio access technology (RAT) and may operate on one or more frequencies. A RAT may also be referred to as a radio technology, an air interface, etc. A frequency may also be referred to as a carrier, a subcarrier, a frequency channel, a tone, a subband, etc. Each frequency may support a single RAT in a given geographic area in order to avoid interference between wireless networks of different RATs. In some cases, a 5G NR RAT network may be deployed.

Figure 1:
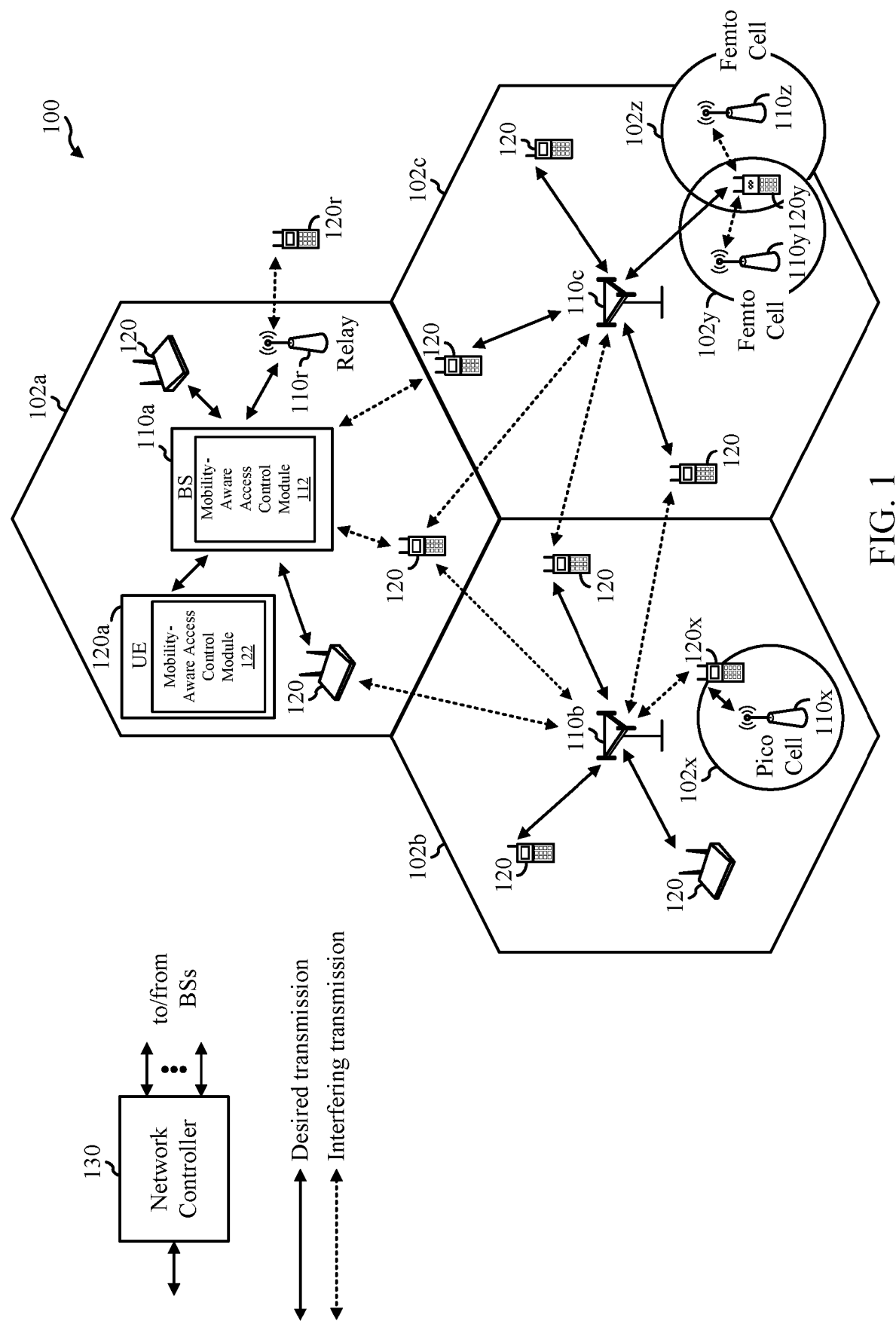
FIG. 1 is a block diagram conceptually illustrating an example telecommunications system, in accordance with certain aspects of the present disclosure.

FIG. 1 illustrates an example wireless communication network 100 in which aspects of the present disclosure may be performed. For example, the wireless communication network 100 may be an NR system (e.g., a 5G NR network).

As illustrated in FIG. 1, the wireless communication network 100 may include a number of base stations (BSs) 110a-z (each also individually referred to herein as BS 110 or collectively as BSs 110) and other network entities. A BS 110 may provide communication coverage for a particular geographic area, sometimes referred to as a "cell", which may be stationary or may move according to the location of a mobile BS 110. In some examples, the BSs 110 may be interconnected to one another and/or to one or more other BSs or network nodes (not shown) in wireless communication network 100 through various types of backhaul interfaces (e.g., a direct physical connection, a wireless connection, a virtual network, or the like) using any suitable transport network. In the example shown in FIG. 1, the BSs 110a, 110b and 110c may be macro BSs for the macro cells 102a, 102b and 102c, respectively. The BS 110x may be a pico BS for a pico cell 102x. The BSs 110y and 110z may be femto BSs for the femto cells 102y and 102z, respectively. A BS may support one or multiple cells. The BSs 110 communicate with user equipment (UEs) 120a-y (each also individually referred to herein as UE 120 or collectively as UEs 120) in the wireless communication network 100. The UEs 120 (e.g., 120x, 120y, etc.) may be dispersed throughout the wireless communication network 100, and each UE 120 may be stationary or mobile.

According to certain aspects, the BSs 110 and UEs 120 may be configured for mobility-aware access control as described herein. As shown in FIG. 1, the BS 110a includes a mobility-aware access control module 112. The mobility-aware access control module 112 may be configured to perform the operations illustrated in one or more of FIGS. 5-15 for mobility-aware access control, in accordance with aspects of the present disclosure. Additionally, as shown in FIG. 1, the UE 120a includes a mobility-aware access control module 122. The mobility-aware access control module 122 may be configured to perform the operations illustrated in one or more of FIGS. 5-15 for mobility-aware access control, in accordance with aspects of the present disclosure.

Wireless communication network 100 may also include relay stations (e.g., relay station 110r), also referred to as relays or the like, that receive a transmission of data and/or other information from an upstream station (e.g., a BS 110a or a UE 120r) and sends a transmission of the data and/or other information to a downstream station (e.g., a UE 120 or a BS 110), or that relays transmissions between UEs 120, to facilitate communication between devices.

A network controller 130 may couple to a set of BSs 110 and provide coordination and control for these BSs 110. The network controller 130 may communicate with the BSs 110 via a backhaul. The BSs 110 may also communicate with one another (e.g., directly or indirectly) via wireless or wireline backhaul.

Figure 2:
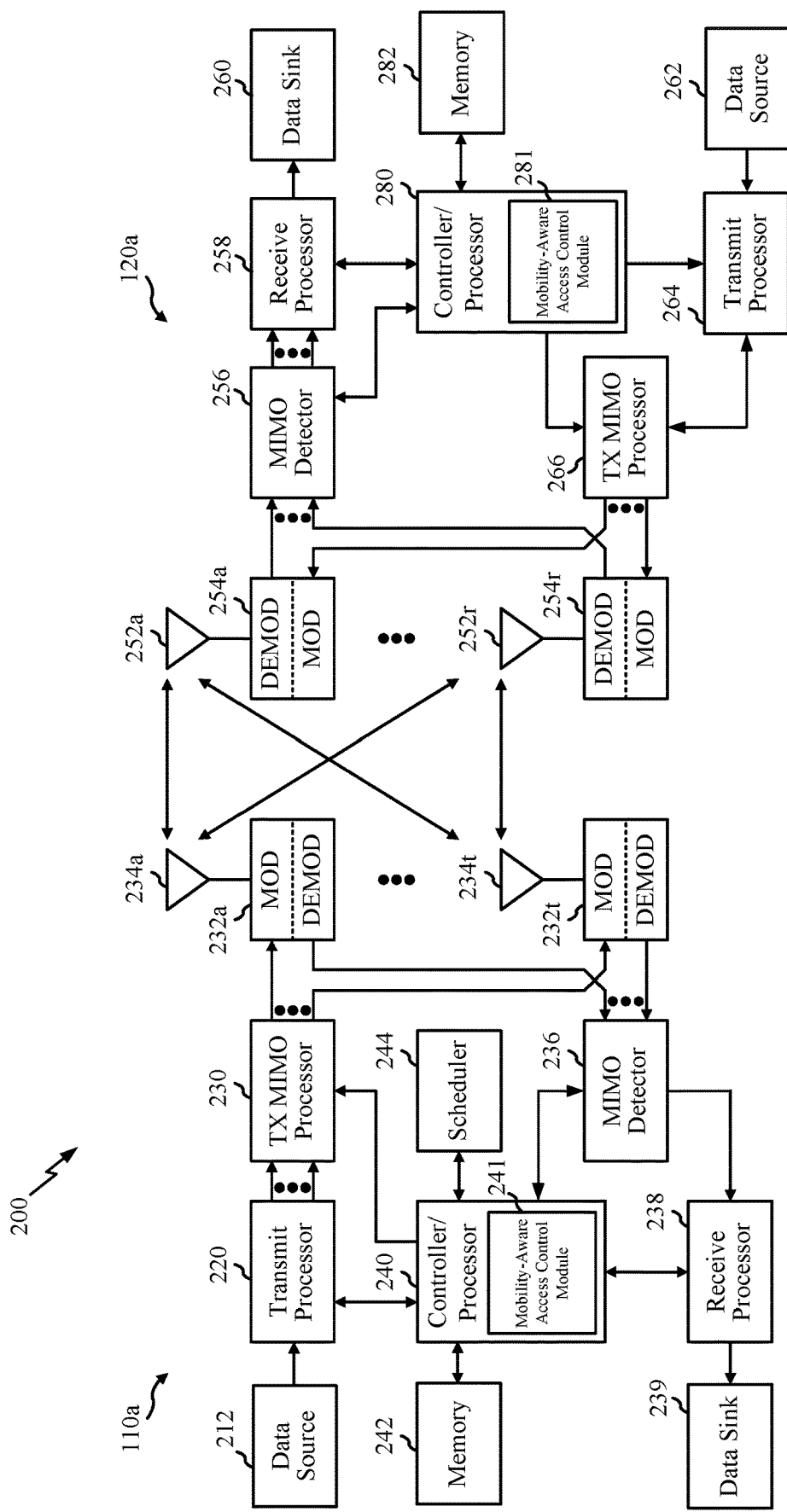
FIG. 2 is a block diagram conceptually illustrating a design of an example a base station (BS) and user equipment (UE), in accordance with certain aspects of the present disclosure.

FIG. 2 illustrates example components of BS 110a and UE 120a (e.g., in the wireless communication network 100 of FIG. 1), which may be used to implement aspects of the present disclosure.

At the BS 110a, a transmit processor 220 may receive data from a data source 212 and control information from a controller/processor 240. The control information may be for the physical broadcast channel (PBCH), physical control format indicator channel (PCFICH), physical hybrid ARQ indicator channel (PHICH), physical downlink control channel (PDCCH), group common PDCCH (GC PDCCH), etc. The data may be for the physical downlink shared channel (PDSCH), etc. The processor 220 may process (e.g., encode and symbol map) the data and control information to obtain data symbols and control symbols, respectively. The transmit processor 220 may also generate reference symbols, such as for the primary synchronization signal (PSS), secondary synchronization signal (SSS), and cell-specific reference signal (CRS). A transmit (TX) multiple-input multiple-output (MIMO) processor 230 may perform spatial processing (e.g., precoding) on the data symbols, the control symbols, and/or the reference symbols, if applicable, and may provide output symbol streams to the modulators (MODs) in transceivers 232a-232t. Each modulator in transceivers 232a-232t may process a respective output symbol stream (e.g., for OFDM, etc.) to obtain an output sample stream. Each modulator may further process (e.g., convert to analog, amplify, filter, and upconvert) the output sample stream to obtain a downlink signal. Downlink signals from modulators in transceivers 232a-232t may be transmitted via the antennas 234a-234t, respectively.

At the UE 120a, the antennas 252a-252r may receive the downlink signals from the BS 110a and may provide received signals to the demodulators (DEMODs) in transceivers 254a-254r, respectively. Each demodulator in transceivers may condition (e.g., filter, amplify, downconvert, and digitize) a respective received signal to obtain input samples. Each demodulator may further process the input samples (e.g., for OFDM, etc.) to obtain received symbols. A MIMO detector 256 may obtain received symbols from all the demodulators in transceivers 254a-254r, perform MIMO detection on the received symbols if applicable, and provide detected symbols. A receive processor 258 may process (e.g., demodulate, deinterleave, and decode) the detected symbols, provide decoded data for the UE 120a to a data sink 260, and provide decoded control information to a controller/processor 280.

On the uplink, at UE 120a, a transmit processor 264 may receive and process data (e.g., for the physical uplink shared channel (PUSCH)) from a data source 262 and control information (e.g., for the physical uplink control channel (PUCCH) from the controller/processor 280. The transmit processor 264 may also generate reference symbols for a reference signal (e.g., for the sounding reference signal (SRS)). The symbols from the transmit processor 264 may be precoded by a TX MIMO processor 266 if applicable, further processed by the demodulators in transceivers 254a-254r (e.g., for SC-FDM, etc.), and transmitted to the BS 110a. At the BS 110a, the uplink signals from the UE 120a may be received by the antennas 234, processed by the modulators in transceivers 232a-232t, detected by a MIMO detector 236 if applicable, and further processed by a receive processor 238 to obtain decoded data and control information sent by the UE 120a. The receive processor 238 may provide the decoded data to a data sink 239 and the decoded control information to the controller/processor 240.

The memories 242 and 282 may store data and program codes for BS 110a and UE 120a, respectively. A scheduler 244 may schedule UEs for data transmission on the downlink and/or uplink.

The controller/processor 280 and/or other processors and modules at the UE 120a may perform or direct the execution of processes for the techniques described herein. For example, as shown in FIG. 2, the controller/processor 240 of the BS 110a includes a mobility-aware access control module 241 that may be configured to perform the operations illustrated in one or more of FIGS. 5-15 for mobility-aware access control, according to aspects described herein. As shown in FIG. 2, the controller/processor 280 of the UE 120a includes a mobility-aware access control module manager 281 that may be configured to perform the operations illustrated in one or more of FIGS. 5-15 for mobility-aware access control, according to aspects described herein. Although shown at the Controller/Processor, other components of the UE 120a and BS 110a may be used performing the operations described herein.

Figure 3:
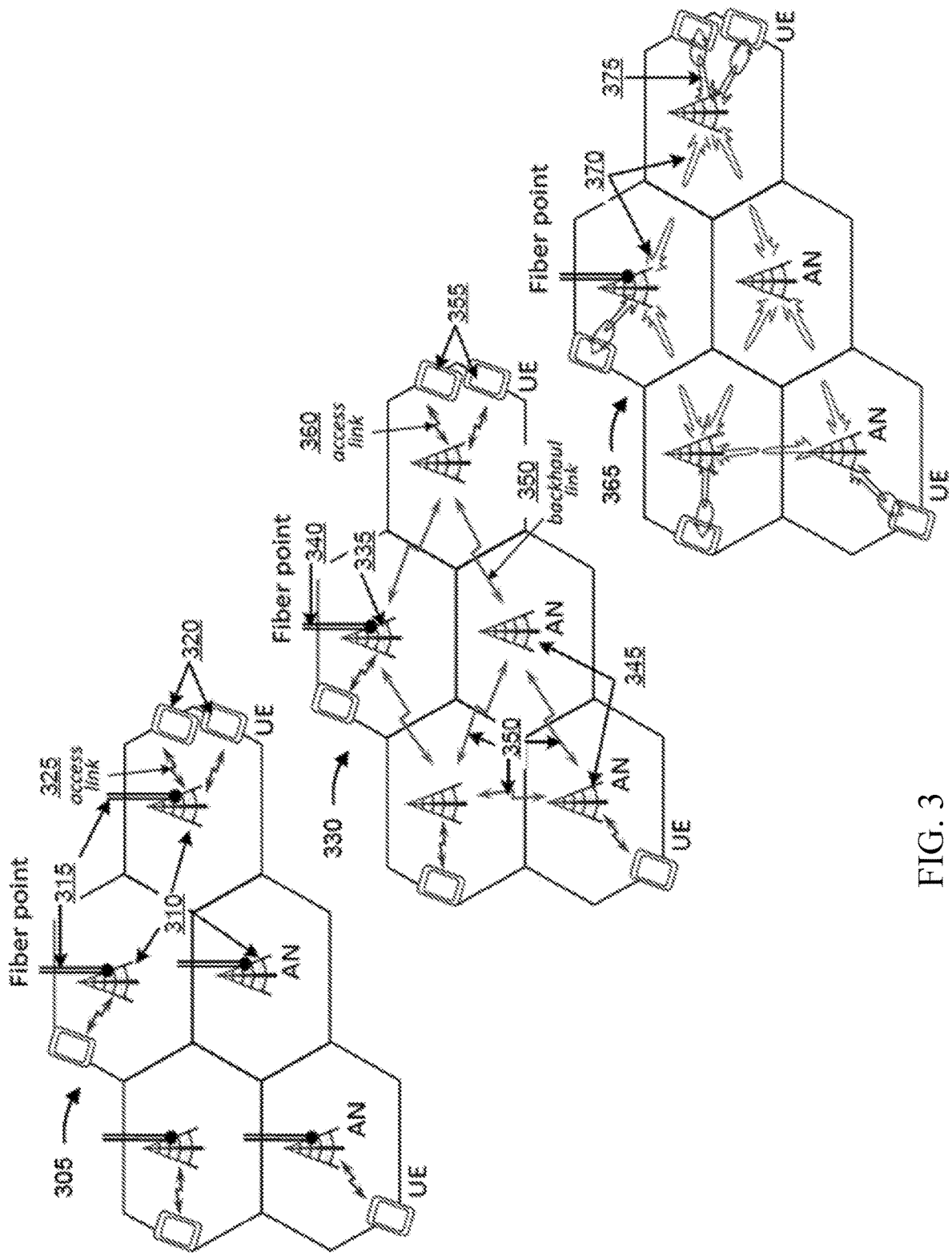
FIG. 3 is a diagram illustrating examples of radio access networks, in accordance with various aspects of the present disclosure.

FIG. 3 is a diagram illustrating examples of radio access networks, in accordance with various aspects of the disclosure.

As shown by reference number 305, a traditional (for example, 3G, 4G, LTE) radio access network may include multiple base stations 310 (for example, access nodes (AN)), where each base station 310 communicates with a core network via a wired backhaul link 315, such as a fiber connection. A base station 310 may communicate with a UE 320 via an access link 325, which may be a wireless link. In some aspects, a base station 310 shown in FIG. 3 may correspond to a base station 110 shown in FIG. 1. Similarly, a UE 320 shown in FIG. 3 may correspond to a UE 120 shown in FIG. 1.

As shown by reference number 330, a radio access network may include a wireless backhaul network. In some aspects or scenarios, a wireless backhaul network may sometimes be referred to as an integrated access and backhaul (IAB) network. An IAB network may include multiple base stations and sometimes the base stations may be of differing types or have differing operational characteristics. For example, in some aspects, an IAB network may have at least one base station that is an anchor base station 335. The anchor base station may communicates with a core network via a wired backhaul link 340, such as a fiber connection. An anchor base station 335 may also be referred to as an IAB donor. Anchor base stations can be configured to communicate with other types of base stations or other communication devices (e.g. in a radio network or IAB network).

The IAB network may also include one or more non-anchor base stations 345. Non-anchor base stations may be referred to as relay base stations or IAB nodes. The non-anchor base station 345 may communicate directly with or indirectly with (for example, via one or more other non-anchor base stations 345) the anchor base station 335 via one or more backhaul links 350 to form a backhaul path to the core network for carrying backhaul traffic. Backhaul link 350 may be a wireless link. Anchor base station(s) 335 or non-anchor base station(s) 345 may communicate with one or more UEs 355 via access links 360, which may be wireless links for carrying access traffic. In some aspects, an anchor base station 335 or a non-anchor base station 345 shown in FIG. 3 may correspond to a base station 110 shown in FIG. 1. Similarly, a UE 355 shown in FIG. 3 may correspond to a UE 120 shown in FIG. 1.

As shown by reference number 365, in some aspects, a radio access network that includes an IAB network may utilize a variety of spectrum types. For example, an IAB network may utilize a variety of differing radio frequency bands. In a few particular examples and according to some aspects, millimeter wave technology or directional communications can be utilized (for example, beamforming, precoding) for communications between base stations or UEs (for example, between two base stations, between two UEs, or between a base station and a UE). In additional or alternative aspects or examples, wireless backhaul links 370 between base stations may use millimeter waves to carry information or may be directed toward a target base station using beamforming, precoding. Similarly, the wireless access links 375 between a UE and a base station may use millimeter waves or may be directed toward a target wireless node (for example, a UE or a base station). In this way, inter-link interference may be reduced.

In some aspects, an IAB network may support a multi-hop network or a multi-hop wireless backhaul. Additionally, or alternatively, each node of an IAB network may use the same radio access technology (for example, 5G/NR). Additionally, or alternatively, nodes of an IAB network may share resources for access links and backhaul links, such as time resources, frequency resources, spatial resources. Furthermore, various architectures of IAB nodes or IAB donors may be supported.

In some aspects, an IAB donor may include a central unit (CU) that configures IAB nodes that access a core network via the IAB donor and may include a distributed unit (DU) that schedules and communicates with child nodes of the IAB donor.

In some aspects, an IAB node may include a mobile termination component (MT) that is scheduled by and communicates with a DU of a parent node, and may include a DU that schedules and communicates with child nodes of the IAB node. A DU of an IAB node may perform functions described in connection with base station 110 for that IAB node, and an MT of an IAB node may perform functions described in connection with UE 120 for that IAB node.

Figure 4:
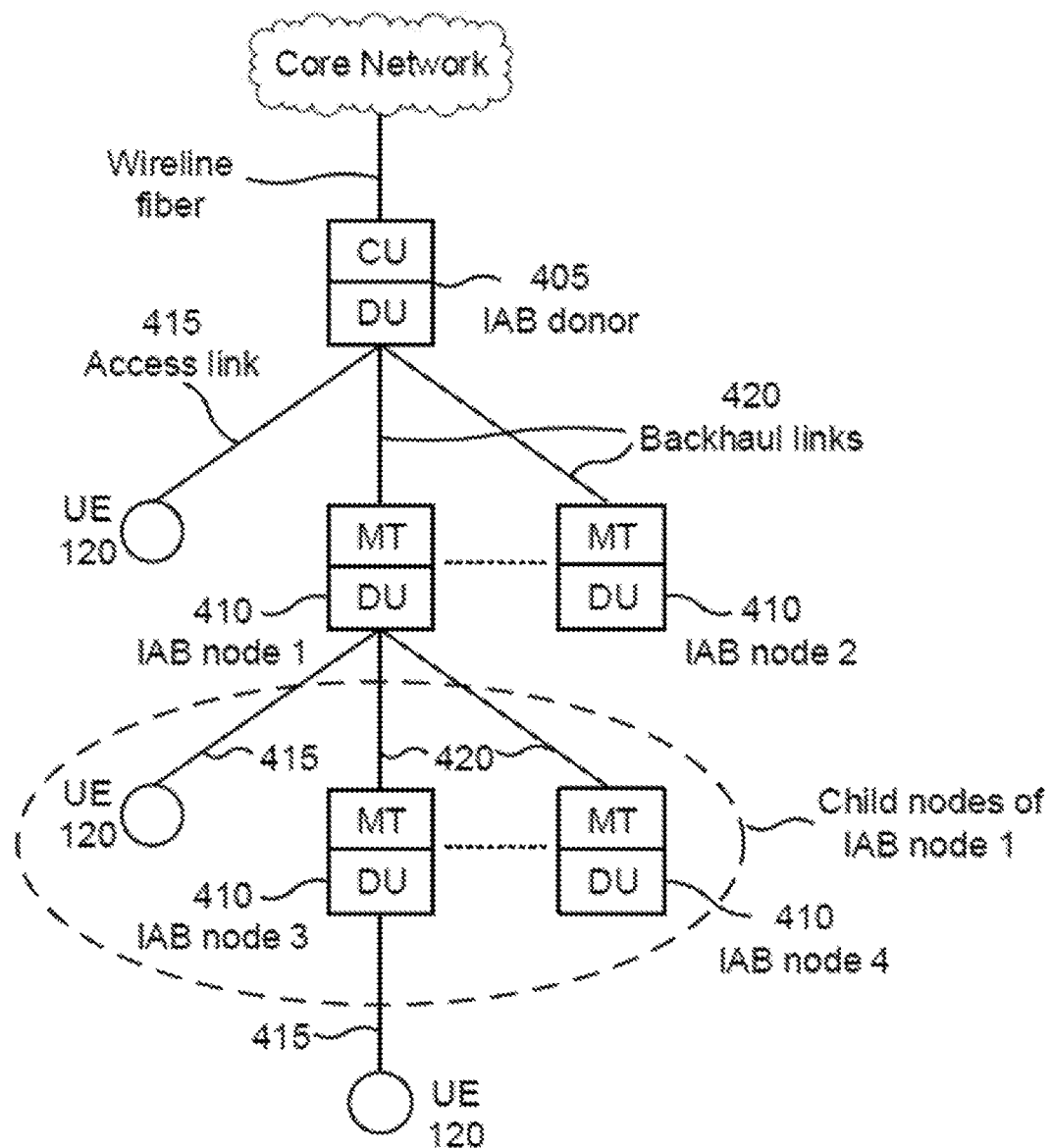
FIG. 4 is a diagram illustrating an example of an integrated access and backhaul (IAB) network architecture in accordance with various aspects of the disclosure.

FIG. 4 is a diagram illustrating an example of an IAB network architecture, in accordance with various aspects of the disclosure. As shown in FIG. 4, an IAB network may include an IAB donor 405 that connects to a core network via a wired connection (for example, as a wireline fiber). For example, an Ng interface of an IAB donor 405 may terminate at a core network. Additionally, or alternatively, an IAB donor 405 may connect to one or more devices of the core network that provide a core access and mobility management function (AMF). In some aspects, an IAB donor 405 may include a base station 110, such as an anchor base station, as described above in connection with FIG. 3. As shown, an IAB donor 405 may include a CU, which may perform ANC functions or AMF functions. The CU may configure a DU of the IAB donor 405 or may configure one or more IAB nodes 410 (for example, an MT or a DU of an IAB node 410) that connect to the core network via the IAB donor 405. Thus, a CU of an IAB donor 405 may control or configure the entire IAB network that connects to the core network via the IAB donor 405, such as by using control messages or configuration messages (for example, a radio resource control (RRC) configuration message, an F1 application protocol (F1AP) message).

As described above, the IAB network may include IAB nodes 410 (shown as IAB nodes 1 through 4) that connect to the core network via the IAB donor 405. As shown, an IAB node 410 may include an MT and may include a DU. The MT of an IAB node 410 (for example, a child node) may be controlled or scheduled by another IAB node 410 (for example, a parent node) or by an IAB donor 405. The DU of an IAB node 410 (for example, a parent node) may control or schedule other IAB nodes 410 (for example, child nodes of the parent node) or UEs 120. Thus, a DU may be referred to as a scheduling node or a scheduling component, and an MT may be referred to as a scheduled node or a scheduled component. In some aspects, an IAB donor 405 may include a DU and not an MT. That is, an IAB donor 405 may configure, control, or schedule communications of IAB nodes 410 or UEs 120. A UE 120 may include only an MT, and not a DU. That is, communications of a UE 120 may be controlled or scheduled by an IAB donor 405 or an IAB node 410 (for example, a parent node of the UE 120).

According to some aspects, certain nodes may be configured to participate in control/scheduling processes. For example in some aspects, when a first node controls or schedules communications for a second node (for example, when the first node provides DU functions for the second node's MT), the first node may be referred to as a parent node of the second node, and the second node may be referred to as a child node of the first node. A child node of the second node may be referred to as a grandchild node of the first node. Thus, a DU of a parent node may control or schedule communications for child nodes of the parent node. A parent node may be an IAB donor 405 or an IAB node 410, and a child node may be an IAB node 410 or a UE 120. Communications of an MT of a child node may be controlled or scheduled by a parent node of the child node.

As further shown in FIG. 4, a link between a UE 120 and an IAB donor 405, or between a UE 120 and an IAB node 410, may be referred to as an access link 415. Each access link 415 may be a wireless access link that provides a UE 120 with radio access to a core network via the IAB donor 405, and potentially via one or more IAB nodes 410.

As further shown in FIG. 4, a link between an IAB donor 405 and an IAB node 410, or between two IAB nodes 410, may be referred to as a backhaul link 420. Each backhaul link 420 may be a wireless backhaul link that provides an IAB node 410 with radio access to a core network via the IAB donor 405, and potentially via one or more other intermediate IAB nodes 410. In some aspects, a backhaul link 420 may be a primary backhaul link or a secondary backhaul link (for example, a backup backhaul link). In some aspects, a secondary backhaul link may be used if a primary backhaul link fails, becomes congested, or becomes overloaded. In an IAB network, network resources for wireless communications (for example, time resources, frequency resources, spatial resources) may be shared between access links 415 and backhaul links 420.

As described above, in a typical IAB network, IAB nodes (for example, non-anchor base stations) are stationary (that is, non-moving). Conversely, in a mobile IAB network, some of the IAB nodes may have mobility (that is, may move around in the IAB network). Such IAB nodes may be referred to as mobile IAB nodes. For example, an IAB node may be installed on a vehicle (for example, a bus, a train, a taxi). In a mobile IAB network, there may be a mix of stationary and mobile IAB nodes. In some cases, the mobile IAB nodes may be constrained to be "leaf" nodes in the mobile IAB network. That is, a mobile IAB node may be permitted to be only a last-hop IAB node, with only child access UEs connected to the mobile IAB node. In some other cases, a mobile IAB node also may be permitted to have another IAB node as a child node.

In some examples, a mobile IAB node may provide an independently moving cell site. In such a case, a moving cell site (for example, a vehicle, such as a bus, a train, a taxi) can be used for the IAB node to serve surrounding UEs (for example, in an urban area). Here, the mobile IAB node may move relatively randomly, at relatively low speeds (for example, urban city speed), and over a relatively large distance. In this case, the mobility of a given UE (that is not carried with the vehicle) is independent of the mobility of the IAB node (that is, the movement of the UE is not predictable based on the movement of the mobile IAB node), but may also be at relatively low speeds (a speed similar to the mobile IAB node).

In some other examples, a mobile IAB node may provide a jointly moving cell site (for example, a high-speed train). In such a case, a mobile IAB node may be mounted on the moving cell site (for example, on top of a high-speed train) in order to serve UEs on or in the moving cell site (for example, UEs inside the high-speed train). Here, the mobility of the mobile IAB node may be predictable, at relatively high speeds, and over a large distance. In this use case, UEs on or in the moving cell site move jointly with the mobile IAB node (that is, UE movement is predictable based on the movement of the mobile IAB node).

In some other examples, a mobile IAB node may facilitate a platoon, when, for example, a loose group of UEs is generally moving together. In such a case, a single IAB node may provide network connectivity for nearby UEs. For example, a mobile IAB node mounted on a first vehicle driving on a freeway may provide network connectivity for UEs in the first vehicle as well as for UEs in other vehicles driving on the freeway in the same direction and at a similar speed. In such cases, the mobile IAB node connects to the network, while other vehicles might house respective child nodes. Here, the mobile IAB node moves with local predictability, at a relatively constant speed, and over a relatively large distance. Further, the UEs move jointly with the mobile IAB node.

A mobility state of a communication device or node (e.g., an IAB node) may be defined by a number of characteristics. Generally, a mobility state may refer to a node's mobility class, movement degree, and/or movement capability. A node's mobility state may be static (e.g., not changing) or dynamic (e.g., changing with time). Mobility states may be dependent upon other factors such that it indicates a relative state with respect to other network nodes.

Mobility states may be based on one or more characteristics as desired or according to design/operational principles. A first characteristic may include a level of mobility (for example, stationary, low-speed mobility, medium-speed mobility, high-speed mobility). Mobility levels may generally reflect a point in time velocity, a range of velocities, a running average historical mobility/velocity pattern, or some other characterization of general movement abilities. A second characteristic may include a change or a transition from one mobility state to another (e.g., the mobility state of an IAB node may change or transition over time). For example, a mobile IAB node may transition to stationary (e.g., from low-speed mobility), or may transition from one mobility class to another (e.g., from medium-speed mobility to high-speed mobility). In some instances, a timer may be associated with such a transition (e.g., an IAB node may transition from one state to another within an indicated window of time). Mobility-state characteristics may also generally be shared by a device or among devices for enhanced network operations (e.g., using a variety of signals/messages over various interfaces).

In some cases, the mobility state of a given IAB node may impact operation of the mobile IAB network. For example, the performance of a number of IAB network-related operations may depend on the mobility state of a mobile IAB node. Such IAB network-related operations may include, for example, initial cell access, cell selection/reselection, and cell handover. For example, given the mobility state of a mobile IAB node/cell, the mobile IAB node may or may not be the best choice for a serving cell of a user equipment (UE) or a mobile termination component (MT). For example, serving cell choices may typically be based on signal quality measurements, which may be affected by mobility. Thus, at a first instance in time, the mobile IAB node may have a good signal quality, leading to a UE/MT selecting the mobile IAB to camp on. However, given the mobility of the mobile IAB node, the IAB node may have a poor signal quality at a second instance in time shortly after the first instance. Thus, in this case, the mobile IAB node may not be the best choice as a serving cell for the UE/MT. Accordingly, knowledge of the mobility state of a given IAB node may be desirable to facilitate the cell selection/access/handover operations described above for efficient and acceptable performance of the mobile IAB network.

Example Mobility-Aware Access Control

Aspects of the present disclosure provide techniques for mobility-aware access control. For example, as noted above, in some cases, it may be desirable to consider mobility state information of an IAB node in initial access, cell selection/reselection, and handover procedures to avoid situations where the IAB node may not be suitable as a serving cell due to mobility of the IAB node. However, based on whether (and where) the required mobility state information is available, there may be different options for implementing mobility-aware access control, as described herein.

For example, a first option may involve a centralized solution implemented by a network node, such as a control unit (CU) of an IAB node (e.g., IAB donor 405). According to this option, the network node may control cell (re)selection and/or handovers of a wireless device based on mobility state information, which may be transparent to the wireless device. For example, a wireless device (e.g., UE 120 and/or an MT of an IAB node 410) may follow a typical power/quality-based cell (re)selection procedure to select a target cell (e.g., IAB node 410) to camp on. However, in certain cases, the target cell may not be a suitable serving cell for the wireless device due to mobility of the target cell (e.g., the target cell is moving at a high-speed, in a different direction than the wireless device, etc.), which the UE may not have knowledge of. Thus, in this case, when the wireless device selects a target cell that may not be suitable for the wireless device (e.g., due to a mobility state of the target cell), the network node may instruct the wireless device to hand over to a more suitable cell. Similarly, for a connected wireless device, the target cell to hand over to may be selected based on a mobility state associated with the target cell.

Figure 5:
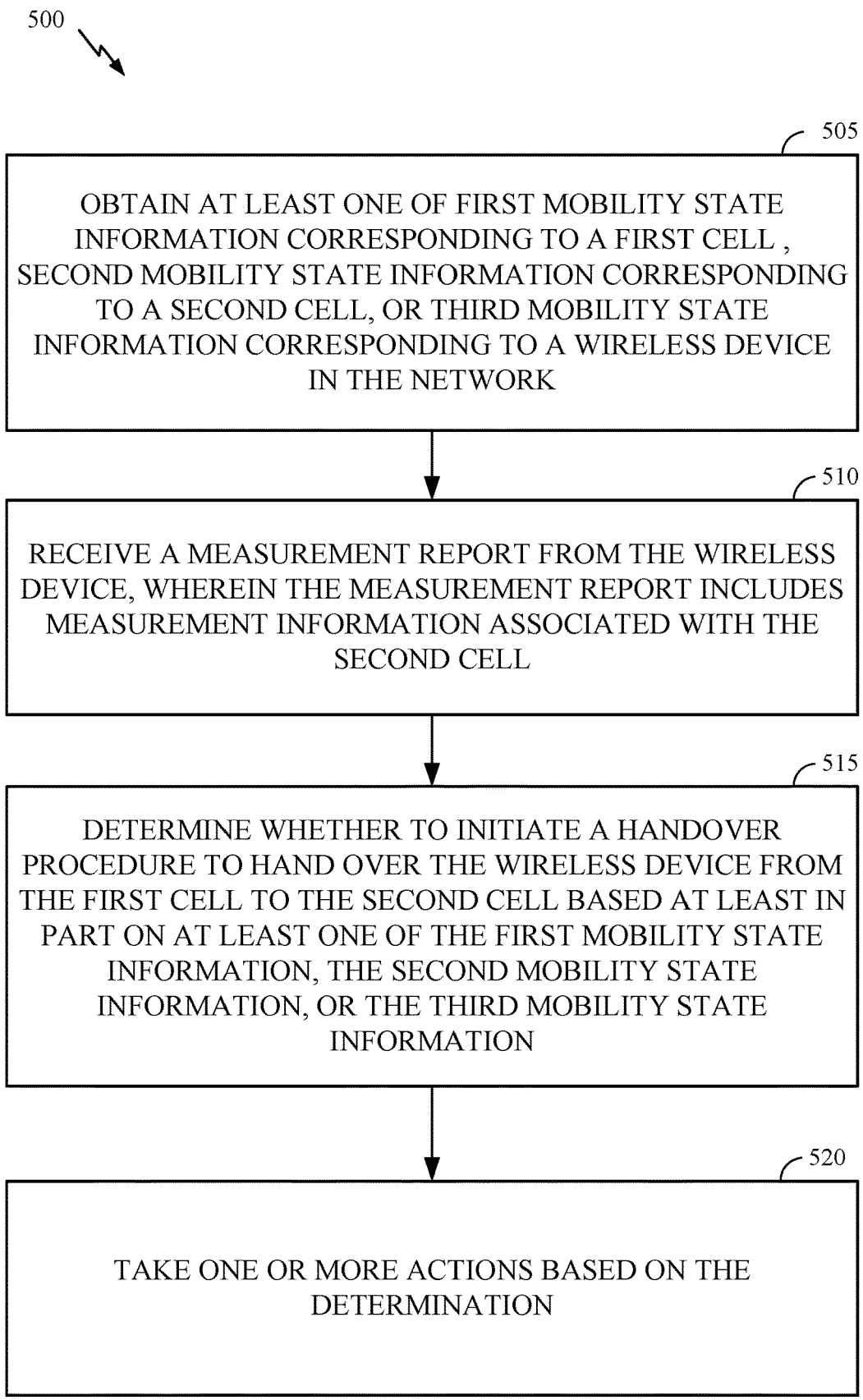
FIG. 5 is a flow diagram illustrating example operations for wireless communication in a network, in accordance with certain aspects of the present disclosure.

FIG. 5 is a flow diagram illustrating example operations 500 for wireless communication in a network, in accordance with certain aspects of the present disclosure. The operations 500 may be performed, for example, by a network node, such as a control unit (CU) in a IAB node (e.g., IAB donor 405). Operations 500 may be implemented as software components that are executed and run on one or more processors (e.g., controller/processor 240 of FIG. 2). Further, the transmission and reception of signals by the network node in operations 500 may be enabled, for example, by one or more antennas (e.g., antennas 234 of FIG. 2). In certain aspects, the transmission and/or reception of signals by the network may be implemented via a bus interface of one or more processors (e.g., controller/processor 240) obtaining and/or outputting signals.

The operations 500 may begin, at 505, by obtaining at least one of first mobility state information corresponding to a first cell in the network, second mobility state information corresponding to a second cell in the network, or third mobility state information corresponding to a wireless device in the network.

At 510, the network node receive a measurement report from the wireless device, wherein the measurement report includes measurement information associated with the second cell.

At 515, the network node determines whether to initiate a handover procedure to hand over the wireless device from the first cell to the second cell based at least in part on at least one of the first mobility state information, the second mobility state information, or the third mobility state information.

At 520, the network node takes one or more actions based on the determination.

As noted above, under a centralized approach to mobility-aware access control, a network node may control cell (re)selection and/or handovers of a wireless device based on mobility state information.

Figure 6:
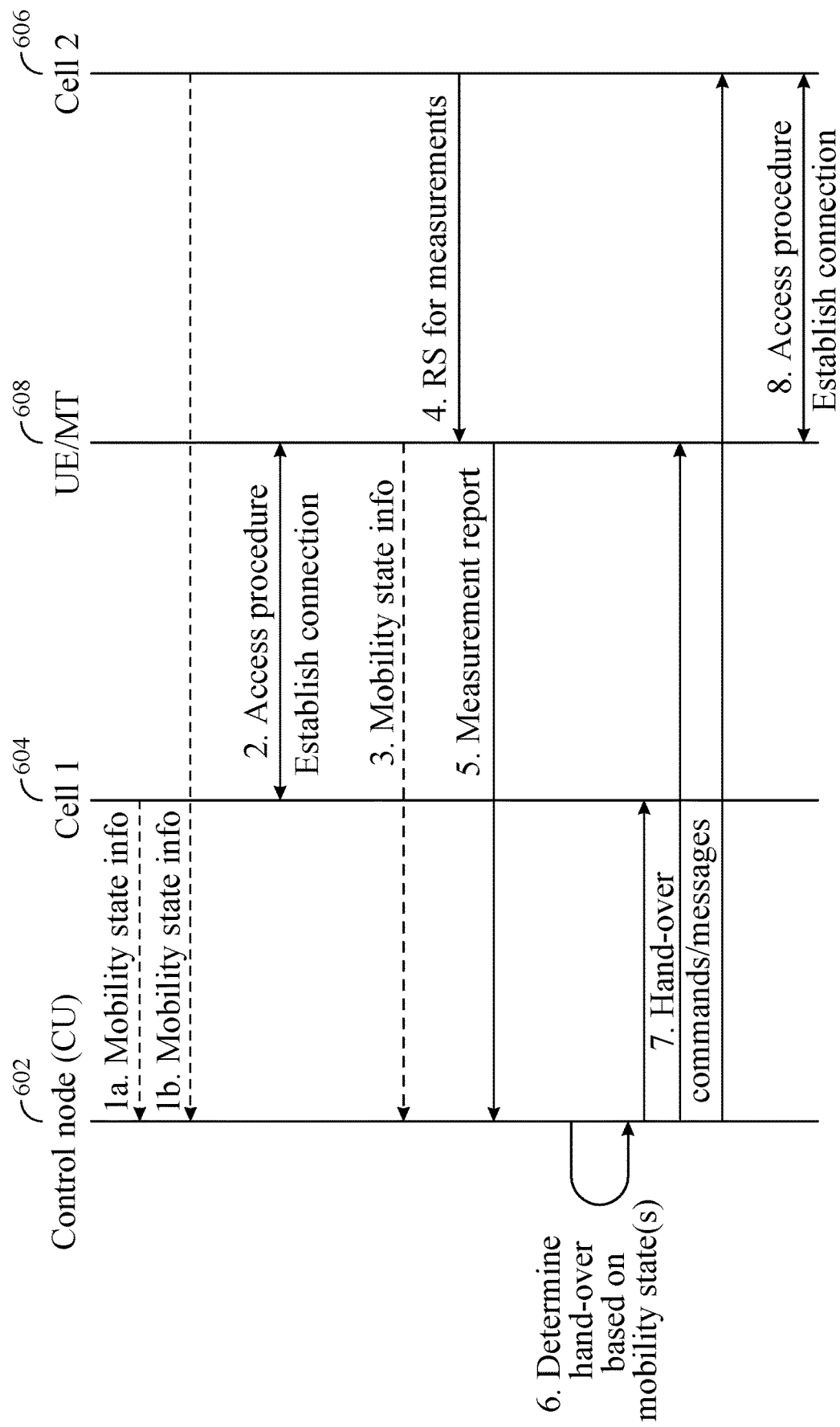
FIG. 6 illustrates a detailed call-flow diagram of centralized mobility-aware access control techniques, according to certain aspects presented herein.

FIG. 6 illustrates a detailed call-flow diagram of centralized mobility-aware access control techniques, according to certain aspects presented herein. Though call-flow or operational descriptions herein may be described as certain actions as steps, the described actions or steps may be preferred in variety of arrangements or orders. By providing example logical descriptions, those of skill in the art will understand various permutations are achievable and possible.

For example, as illustrated in FIG. 6, at steps 1a and 1b, a network node 602, such as a CU (which may be part of the first cell), may obtain first mobility state information corresponding to a first cell 604 and second mobility state information corresponding to a second cell 606. In certain cases, obtaining the first mobility state information may include inferring the first mobility state information based, at least in part, on prior measurement information or prior location information associated with the first cell 604. Similarly, in some cases, obtaining the second mobility state information may include inferring the second mobility state information based, at least in part, on prior measurement information or prior location information associated with the second cell 606. For example, in some cases, based on prior measurement and/or location information of the first cell 604 and/or second cell 606, the network node 602 may be able to infer whether the first cell 604 and/or second cell 606 are relatively static or not, for example, in relation to a wireless device, such as the UE/MT 608. For example, in some cases, the network node 602 may be able to infer whether the first cell 604 and/or second cell 606 cell are moving, or not moving, in a same direction as the UE/MT 608 based on the prior measurement information and/or location information of the first cell 604 and/or second cell 606. In some cases, the network node 602 may receive an explicit indication from the first cell 604 and/or the second cell 606, indicating the first mobility state information and/or the second mobility state information.

According to aspects, the mobility state information may provide an indication of a level of mobility corresponding to the wireless device from which it was received (e.g., the first cell 604, the second cell 606, or the UE/MT 608). For example, the level of mobility may comprise one of stationary mobility, low-speed mobility, medium-speed mobility, or high-speed mobility. Additionally, in some cases, the mobility state information may provide an indication of a change or transition from one mobility state to another corresponding to the wireless device from which it was received (e.g., the first cell 604, the second cell 606, or the UE/MT 608). For example, in some case, the indication of the change or transmission may indicate that the first cell 604 is changing from a high-speed mobility to a stationary mobility, or the like.

At step 2, the UE/MT 608 may perform an access procedure and establish a connection with the first cell 604.

Thereafter, at step 3, the network node 602 may obtain third mobility state information corresponding to the UE/MT 608. In some cases, the network node 602 may receive signaling from the UE/MT 608 indicating the third mobility state information corresponding to the UE/MT 608. In other cases, the network node 602 may obtain the third mobility state information by inferring the third mobility state information based, at least in part, on prior measurement information or prior location information associated with the UE/MT 608 (e.g., similar to inferring with respect to the first cell 604/second cell 606, described above).

At step 4, while camping on the first cell 604, the UE/MT 608 may come in range of a neighboring cell, such as the second cell 606, and perform measurements on one or more signals (e.g., reference signals) received from the second cell 606.

At step 5, the network node 602 may receive a measurement report from the UE/MT 608 that includes measurement information associated with the second cell 606. For example, in some cases, the measurement report may include measurement information taken based on the one or more signals received at the UE/MT 608 from the second cell 606.

At step 6, the network node 602 may determine whether to initiate a handover procedure to hand over the UE/MT 608 from the first cell 604 to the second cell 606 based at least in part on at least one of the first mobility state information, the second mobility state information, or the third mobility state information. In some cases, determining whether to initiate the handover procedure may include determining, based on at least one of the first mobility state information or the third mobility state information, that the first cell 604 is not suitable for the UE/MT 608. For example, in some cases, the network node may determine that the first cell 604 may not be suitable as a serving cell for the UE/MT 608 due to mobility of either the first cell 604 or the UE/MT 608 (e.g., the first cell 604 and UE/MT 608 are moving in different directions, etc.).

Accordingly, at step 7, based on the determination in step 6, the network node 602 may take one or more actions. For example, in some cases, taking the one or more actions may include determining to initiate the handover procedure to hand over the UE/MT 608 from the first cell 604 to the second cell 606 based on the determination that the first cell 604 is not suitable for the UE/MT 608. In this cases, as illustrated at step 7, the network node 602 may transmit a handover command to the UE/MT 608 and the second cell 606, instructing the UE/MT 608 to hand over to the second cell 606 from the first cell 604.

Thereafter, at step 8, based on the handover command, the UE/MT 608 may perform an access procedure and establish a connection with the second cell 606.

Another option for mobility-aware access control may involve a distributed approach where a first wireless device (e.g., a target serving cell) and a second wireless device (e.g., UE/MT) may have the required mobility state information to suitably control their own access (e.g., as opposed to the centralized approach above where the target serving cell/UE/MT do not have the mobility state information and need the CU to assist in access/handover). For example, a distributed approach to mobility-aware access control may involve the UE/MT and target serving cell autonomously determining cell (re)selection/handover decisions based on known mobility state information.

Figure 7:
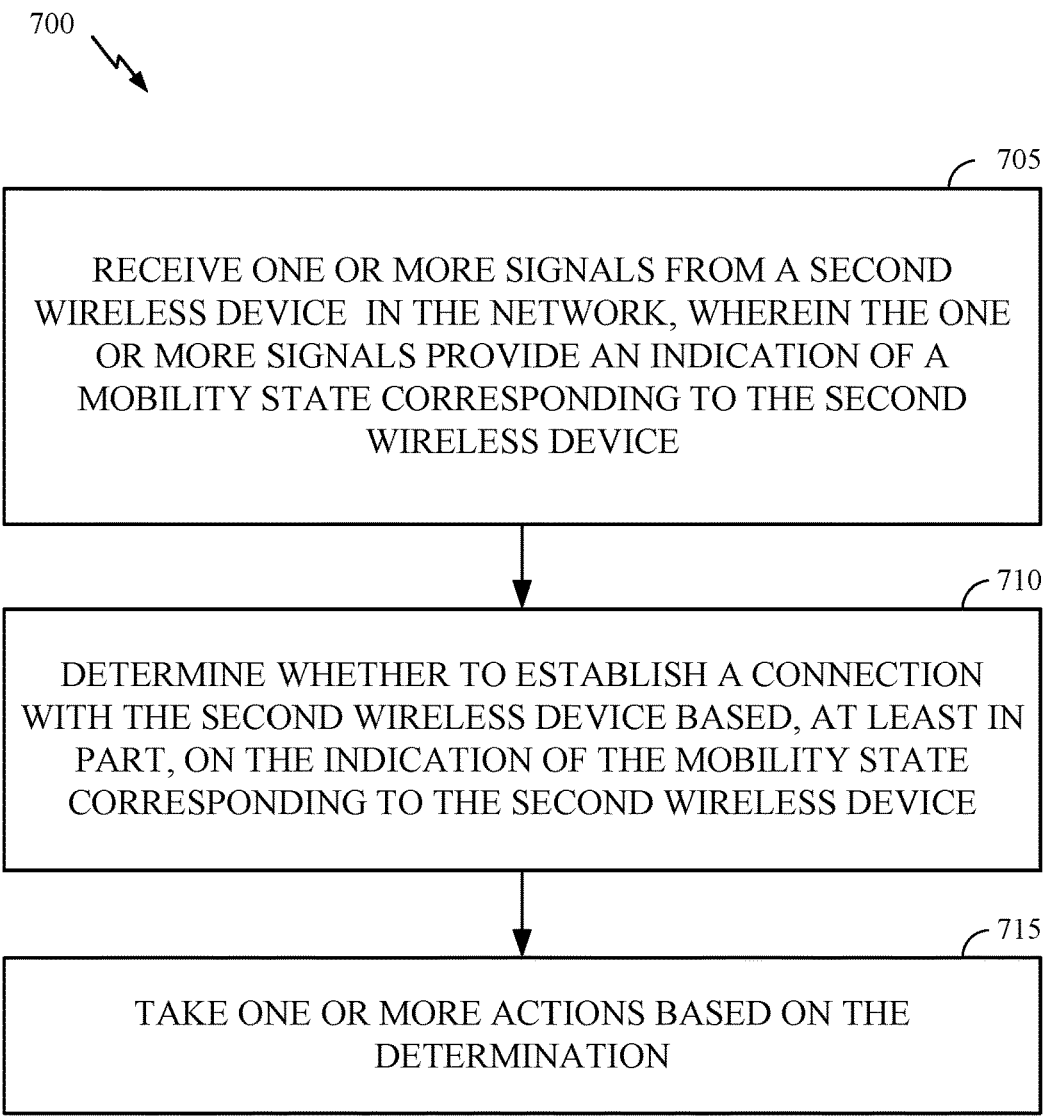
FIG. 7 is a flow diagram illustrating example operations for wireless communication in a network for mobility-aware access control for cell (re)selection, in accordance with certain aspects of the present disclosure.

FIG. 7 is a flow diagram illustrating example operations 700 for wireless communication in a network. These can include, for example, mobility-aware access control for cell (re)selection and/or handover, in accordance with certain aspects of the present disclosure. The operations 700 may be performed, for example, by a first wireless device, such as a target serving cell (e.g., IAB donor 405 and/or IAB node 410), a user equipment (e.g., UE 120), and/or a mobile termination component (MT) of an IAB node 410. Operations 700 may be implemented as software components that are executed and run on one or more processors (e.g., controller/processor 240 or controller/processor 280 of FIG. 2). Further, the transmission and reception of signals by the network node in operations 700 may be enabled, for example, by one or more antennas (e.g., antennas 234, 252 of FIG. 2). In certain aspects, the transmission and/or reception of signals by the network may be implemented via a bus interface of one or more processors (e.g., controller/processor 240 or controller/processor 280) obtaining and/or outputting signals.

The operations 700 may begin, at 705, by receiving one or more signals from a second wireless device in the network, wherein the one or more signals provide an indication of a mobility state corresponding to the second wireless device.

At 710, the first wireless device determines whether to establish a connection with the second wireless device based, at least in part, on the indication of the mobility state corresponding to the second wireless device.

At 715, the first wireless device takes one or more actions based on the determination.

As noted above, the distributed approach to mobility-aware access control may involve the UE/MT and target serving cell autonomously determining cell (re)selection/handover decisions based on known mobility state information.

Figure 8:
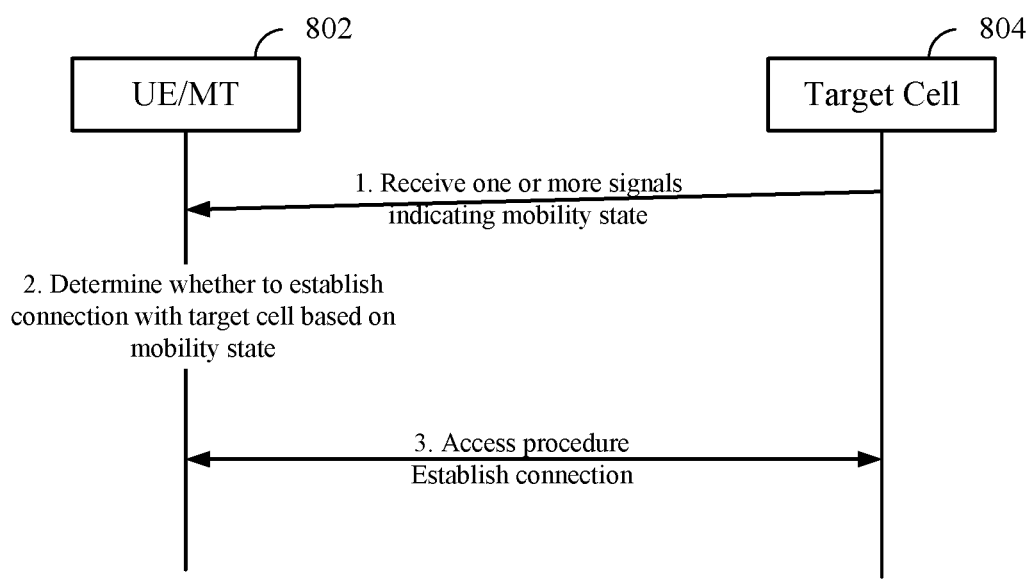
FIG. 8 is a call flow diagram illustrating example operations for mobility-aware access control for cell (re)selection, in accordance with certain aspects of the present disclosure.

For example, FIG. 8 is a call flow diagram illustrating example operations performed by a first wireless device 802, such as a UE 120 and/or MT of an IAB node 410, for mobility-aware access control for cell (re)selection. As illustrated, at step 1, the first wireless device 802 may receive one or more signals from a second wireless device 804, such as a target serving cell. In some cases, the target serving cell may be an MT of an IAB node 410 (e.g., assuming the first wireless device is a UE) or an IAB donor 405 (e.g., assuming the first wireless device is an MT of an IAB node 410).

Signals communicated in a network may take on a number of forms and for various purposes. For example, additionally, in some cases, the one or more signals may comprise at least one of a synchronization signal block (SSB), a physical broadcast channel (PBCH) signal, a remaining system information (RMSI) signal, or a random access channel (RACH) message 2 or RACH message 4. According to aspects, the one or more signals may provide an indication of a mobility state corresponding to the second wireless device 804. In some cases, the indication may be implicit or explicit. For example, in some cases, one or more resources used to transmit the one or more signals may implicitly indicate a mobility state corresponding to the second wireless device 804. For example, in some cases, a first type of resource used to transmit the one or more signals may correspond to a first mobility state or indicate a transition between mobility states while a second type of resource used to transmit the one or more signals may correspond to a second mobility state or indicate a different transition between mobility states. Additionally, in some cases, the mobility state may be an explicit indication included in the one or more signals. For example, in some cases, the second wireless device may provide an explicit indication of its mobility state in a RACH message 2 or RACH message 4. In either case, the first wireless device 802 may receive the one or more signals and determine the mobility state corresponding to the second wireless device 804.

At step 2 illustrated in FIG. 8, the first wireless device 802 may determine whether to establish the connection with the second wireless device 804. A determination of this nature may be based, at least in part or in whole, on the mobility state corresponding to the second wireless device 804. In some cases, this determination may be based on one or more cell selection criteria related to the mobility state corresponding to the second wireless device 804. For example, in some cases, the one or more cell selection criteria may, for example, specify that the first wireless device 802 may only select the second wireless device 804 if the second wireless device 804 has a specific mobility state, is moving in a same direction with a similar mobility state as the first wireless device 802, or the like. According to aspects, in some cases, the one or more cell selection criteria may be specified in a standards document and/or pre-programmed in the first wireless device 802.

According to aspects, determining whether to establish the connection with the second wireless device 804 may include determining to establish the connection with the second wireless device 804 when, based on the indication of the mobility state corresponding to the second wireless device 804, the one or more cell selection criteria are satisfied. For example, in some cases, if the one or more criteria specify that the second wireless device 804 must have a high-moving mobility state and the determined mobility state of the second wireless device 804 satisfies this high-moving mobility state criteria (or any other criteria related to mobility state), then the first wireless device 802 may determine to establish the connection with the second wireless device 804.

According to aspects, if the first wireless device 802 determines to establish the connection with the second wireless device 804, then, at step 3 in FIG. 8, the first wireless device 802 may take one or more actions based on the determination. For example, as illustrated, at step 3, based on the determination, the first wireless device 802 may perform an access procedure and establish a connection with the second wireless device 804.

Yet in some cases, determining whether to establish the connection with the second wireless device 804 can be based on or depend on a number of factors. These may include, for example, determining not to establish the connection with the second wireless device 804 when, based on the indication of the mobility state corresponding to the second wireless device 804, the one or more cell selection criteria are not satisfied. For example, in some cases, if the one or more criteria specify that the second wireless device 804 must have a high-moving mobility state and the determined mobility state of the second wireless device 804 does not satisfy this high-moving mobility state criteria (or any other criteria related to mobility state), then the first wireless device 802 may determine not to establish the connection with the second wireless device 804. Thus, in this case, at step 3, while not illustrated, the first wireless device 802 may take one or more actions, such as searching for and selecting a different, more-suitable second wireless device.

As noted above, in some cases, the first wireless device 802 may determine (or may infer) the mobility state of a second wireless device 804 based on a set of measurements or location information. In other cases, the first wireless device 802 may instead determine or infer its own mobility state with respect to the second wireless node 804 based on a set of measurements or location information. For example, in some cases, the first wireless device 802 may determine whether the first wireless device 802 has low mobility (e.g., is relatively static) or high mobility with respect to the second wireless device 804, and if high mobility, whether the first wireless device 802 is moving towards or away from second wireless node 804.

According to aspects, after the first wireless device 802 determines the mobility state of the second wireless device 804/first wireless device 802, this mobility state information may be used for various purposes such as reporting to another node (e.g. a network node or the second wireless device 804), choosing the second wireless device 804 to establish a connection with, or handing over to or from the second wireless device 804, as discussed above.

In some cases, as noted above, the first wireless device may be a UE (or IAB-node MT) and may measure a signal metric, such as signal strength (e.g. reference signal received power (RSRP)), of the second wireless device (e.g., a cell). The first wireless device may also determine variations in certain signal metrics over a period of time, such as variations of RSRP, Doppler, RTT, and the like. The first wireless device may then decide whether to camp on the cell based, at least in part, on these two factors (e.g., the RSRP and the variation in the signal metrics). For example, the first wireless device may perform measurements on two cells. For example, the first wireless device may determine that a first cell has an RSRP value of X and a variation of Y. Additionally, the first wireless device may determine that a second cell has an RSRP value X+3 dB and a variation 10Y. In this case, the first wireless device may select and camp on the first cell. For example, even though the first wireless device determines that the second cell has a stronger RSRP (and would traditionally be selected due to the stronger RSRP), based on the variation in the signal metrics of the second cell, the first wireless device may infer that the connection to the second wireless device may not be reliable or suitable since the signal metrics of the second wireless device varies significantly (presumable due to higher relative mobility to the second wireless device). Hence, the first wireless device may instead select the first wireless device with the weaker RSRP but with a more reliable/predictable connection (e.g., low variation).

Figure 9:
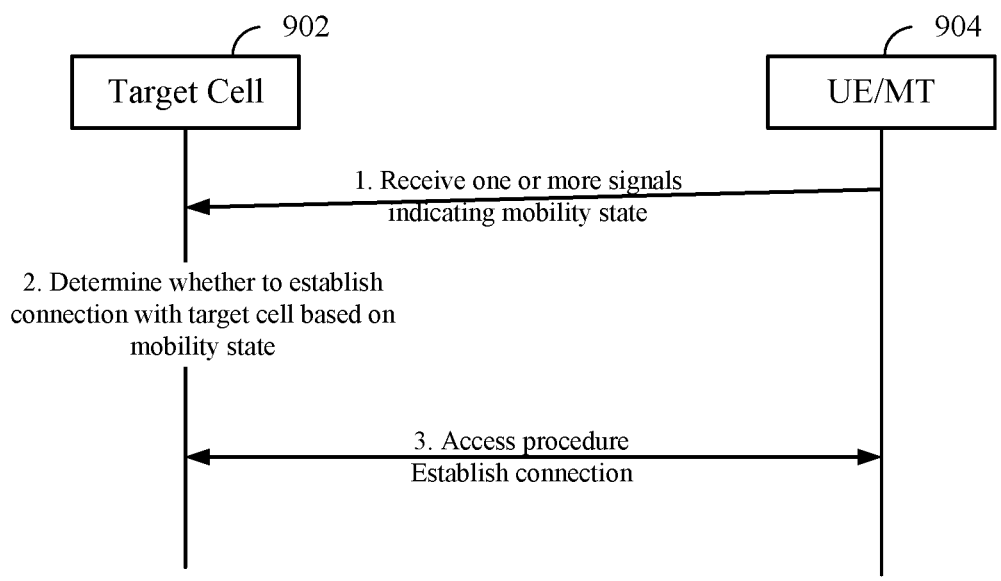
FIG. 9 is a call flow diagram illustrating example operations for mobility-aware access control for cell (re)selection, in accordance with certain aspects of the present disclosure.

FIG. 9 is a call flow diagram illustrating example operations performed by a first wireless device, such as a target cell (e.g., an MT of an IAB node 410 or a IAB donor 405), for mobility-aware access control for cell (re)selection.

As illustrated, at step 1, a first wireless device 902 may receive one or more signals from a second wireless device 904, such as a UE 120 or MT of an IAB node 410. In some cases, the one or more signals comprise at least one of a random access channel (RACH) message 1 or RACH message 3. Further, in some cases, the one or more signals may provide an indication of a mobility state corresponding to the second wireless device 904. As noted above, the indication of the mobility state corresponding to the second wireless device 904 may be provided implicitly or explicitly. For example, in some cases, a RACH preamble ID of the RACH message 1 or resources used to transmit the RACH message 1 may implicitly provide the indication of the mobility state corresponding to the second wireless device 904. Additionally, as noted, in some cases, the indication of the mobility state corresponding to the second wireless device 904 may be provided explicitly, for example, in the RACH message 1 or RACH message 3 from the second wireless device 904.

At step 2 illustrated in FIG. 9, the first wireless device 902 may determine whether to establish the connection with the second wireless device 904. A determination of this nature may be based, at last in part or in whole, on the mobility state corresponding to the second wireless device 904. In some cases, this determination may also be based on one or more cell selection criteria related to the mobility state corresponding to the second wireless device 904, similar to step 2 in FIG. 8.

Further, in some cases, determining whether to establish the connection with the second wireless device 904 may include performing prioritization based on the indication of the mobility state of second wireless device 904. For example, the example of FIG. 9 focuses on (1) the second wireless device 904 (e.g., UE/MT) indicating its mobility state in one or more signals, such as RACH MSG1 or 3, and (2) the first wireless device 902 (e.g., a target cell) performing prioritization based on the mobility state of the second wireless device 904. According to aspects, "prioritization" may be related to a cell "detection" phase. For example, assume the mobility state is indicated by the second wireless device 904 via RACH MSG1. The first wireless device 902 may implement a RACH receiver algorithm to detect any UE/MTs (e.g., second wireless devices 904) sending a RACH MSG1. The implementation of this algorithm and/or the RACH MSG1 configuration may prioritize detecting one class versus the other, for example, by allocating more resources to one class, or by searching for RCAH MSG1 of one class more extensively (e.g. more frequently, or using a beamforming (BF) configuration that achieves higher BF gain). Additionally, in some cases, "prioritization" may be related to the cell "selection" phase. That is, after detecting one or multiple second wireless devices 904 (e.g., UEs/MTs), the first wireless device 902 may decide which second wireless device to select to establish a connection and which second wireless device to reject, or which second wireless device to attempt to establish a connection with first.

Thereafter, according to aspects, determining, by the first wireless device 902, whether to establish the connection with the second wireless device may include one of determining to establish the connection with the second wireless device 904 based on the prioritization or determining not to establish the connection with the second wireless device 904 based on the prioritization.

According to aspects, if the first wireless device 902 determines to establish the connection with the second wireless device 904, then, at step 3 in FIG. 9, the first wireless device 902 may take one or more actions based on the determination. For example, as illustrated, at step 3, based on the determination, the first wireless device 902 may perform an access procedure and establish a connection with the second wireless device 904. However, if the first wireless device 902 determines not to establish the connection with the second wireless device 904, then, at step 3, the first wireless device 902 may take one or more actions, such as informing the second wireless device 904 that a connection will not be established.

Figure 10:
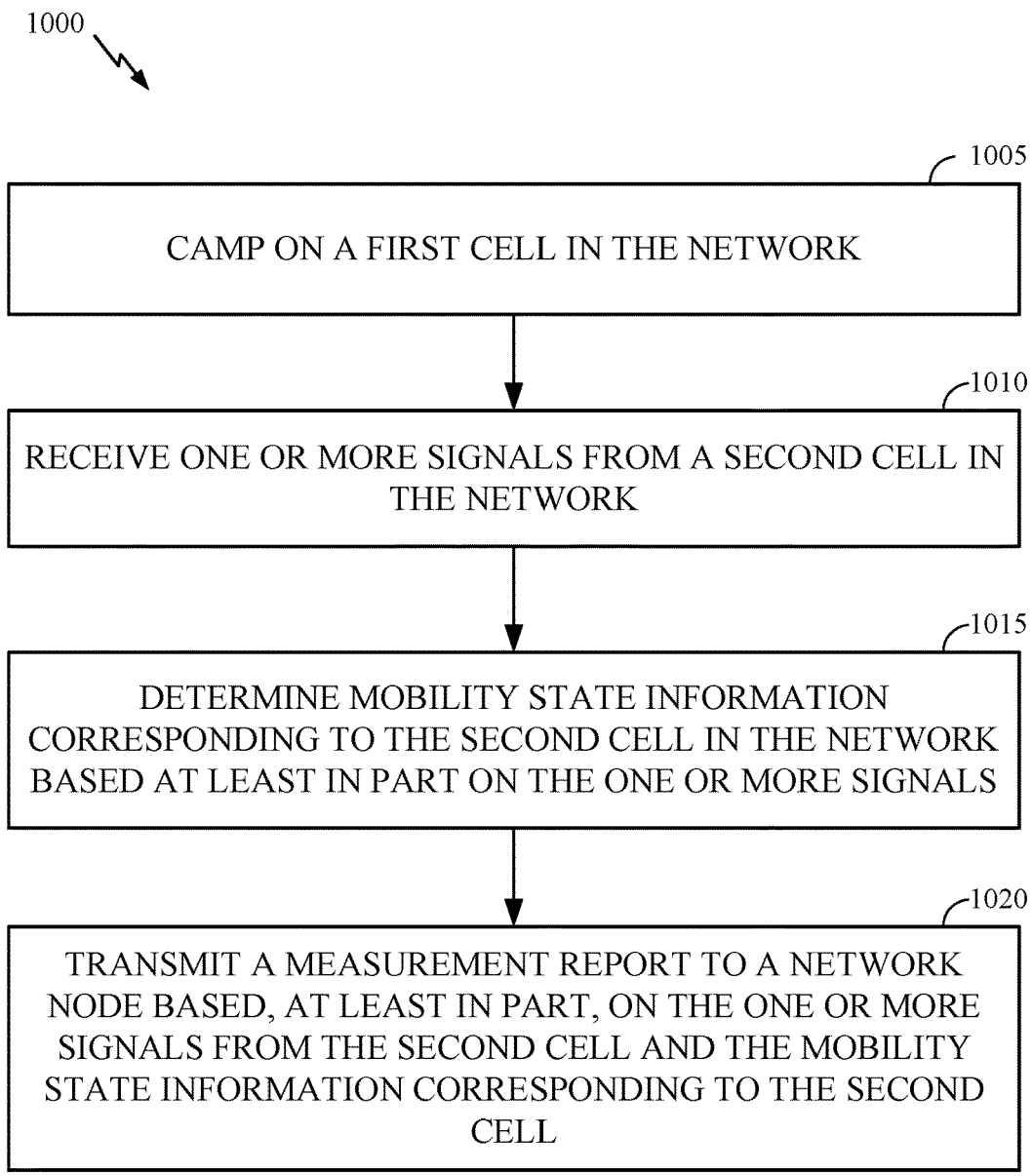
FIG. 10 is a flow diagram illustrating example operations for wireless communication in a network for mobility-aware access control for cell hand over, in accordance with certain aspects of the present disclosure.

FIG. 10 is a flow diagram illustrating example operations 1000 for wireless communication in a network, for example, for mobility-aware access control for cell hand over, in accordance with certain aspects of the present disclosure. The operations 1000 may be performed, for example, by a first wireless device, such as a user equipment (e.g., UE 120) and/or a mobile termination component (MT) of an IAB node 410. Operations 1000 may be implemented as software components that are executed and run on one or more processors (e.g., controller/processor 240 or controller/processor 280 of FIG. 2). Further, the transmission and reception of signals by the network node in operations 1000 may be enabled, for example, by one or more antennas (e.g., antennas 234, 252 of FIG. 2). In certain aspects, the transmission and/or reception of signals by the network may be implemented via a bus interface of one or more processors (e.g., controller/processor 240 or controller/processor 280) obtaining and/or outputting signals.

The operations 1000 may begin, at 1005, by camping on a first cell in the network.

At 1010, the first wireless device receives one or more signals from a second cell in the network.

At 1015, the first wireless device determining mobility state information corresponding to the second cell in the network based at least in part on the one or more signals.

At 1020, the first wireless device transmits a measurement report to a network node based, at least in part, on the one or more signals from the second cell and the mobility state information corresponding to the second cell.

Figure 11:
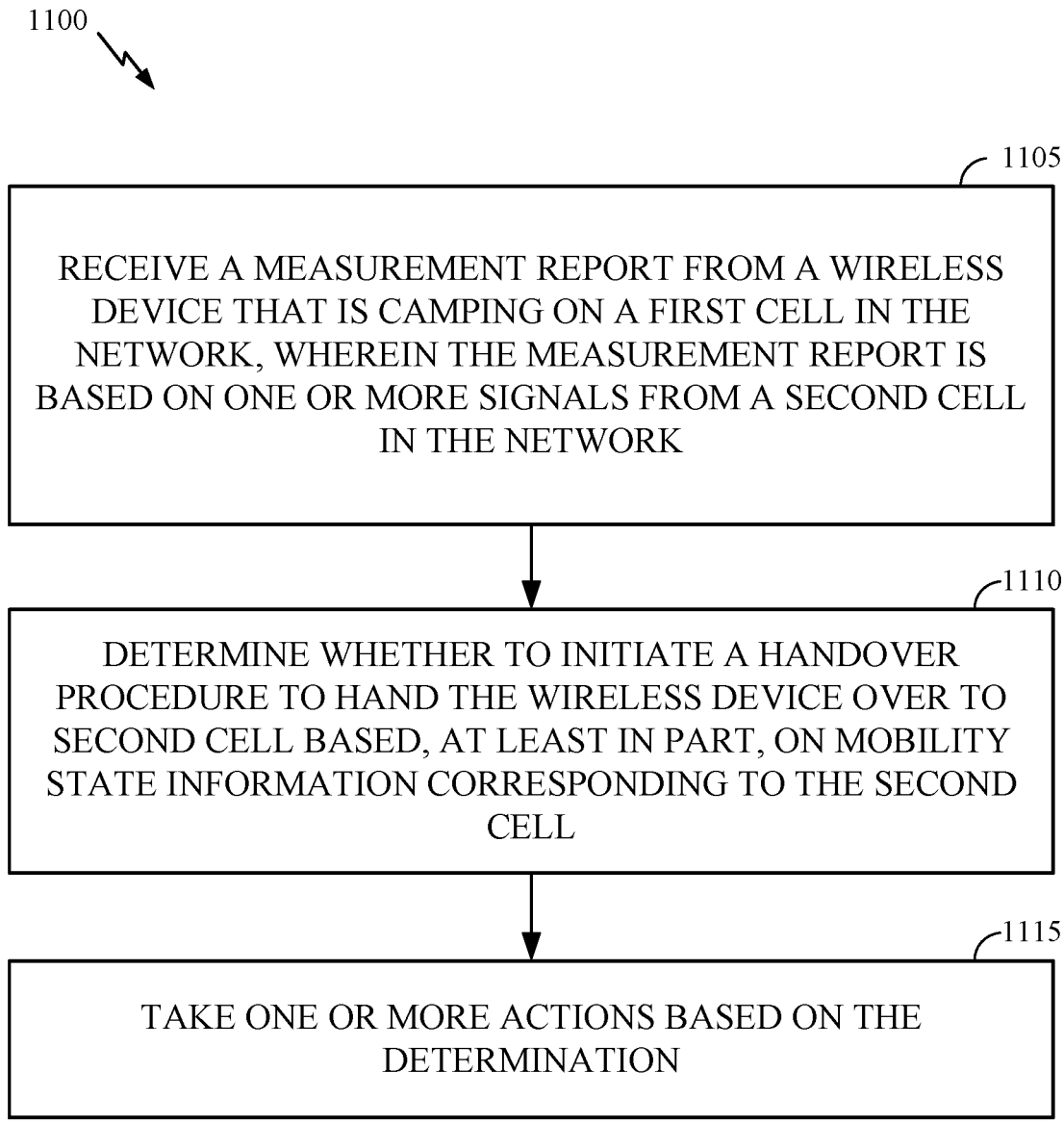
FIG. 11 is a flow diagram illustrating example operations for wireless communication in a network for mobility-aware access control for cell hand over, in accordance with certain aspects of the present disclosure.

FIG. 11 is a flow diagram illustrating example operations 1100 for wireless communication in a network, for example, for mobility-aware access control for cell hand over, in accordance with certain aspects of the present disclosure. The operations 1100 may be performed, for example, by a network node, such as CU of an IAB donor 405. Operations 1100 may be considered complimentary to operations 1000 performed by a UE 120 and/or MT of an IAB node 410.

Operations 1100 may be implemented as software components that are executed and run on one or more processors (e.g., controller/processor 240). Further, the transmission and reception of signals by the network node in operations 1100 may be enabled, for example, by one or more antennas (e.g., antennas 234 of FIG. 2). In certain aspects, the transmission and/or reception of signals by the network may be implemented via a bus interface of one or more processors (e.g., controller/processor 240) obtaining and/or outputting signals.

The operations 1100 may begin, at 1105, by receiving a measurement report from a wireless device that is camping on a first cell in the network, wherein the measurement report is based on one or more signals from a second cell in the network.

At 1110, the network node determines whether to initiate a handover procedure to hand the wireless device over to second cell based, at least in part, on mobility state information corresponding to the second cell.

At 1115, the network node takes one or more actions based on the determination.

Figure 12:
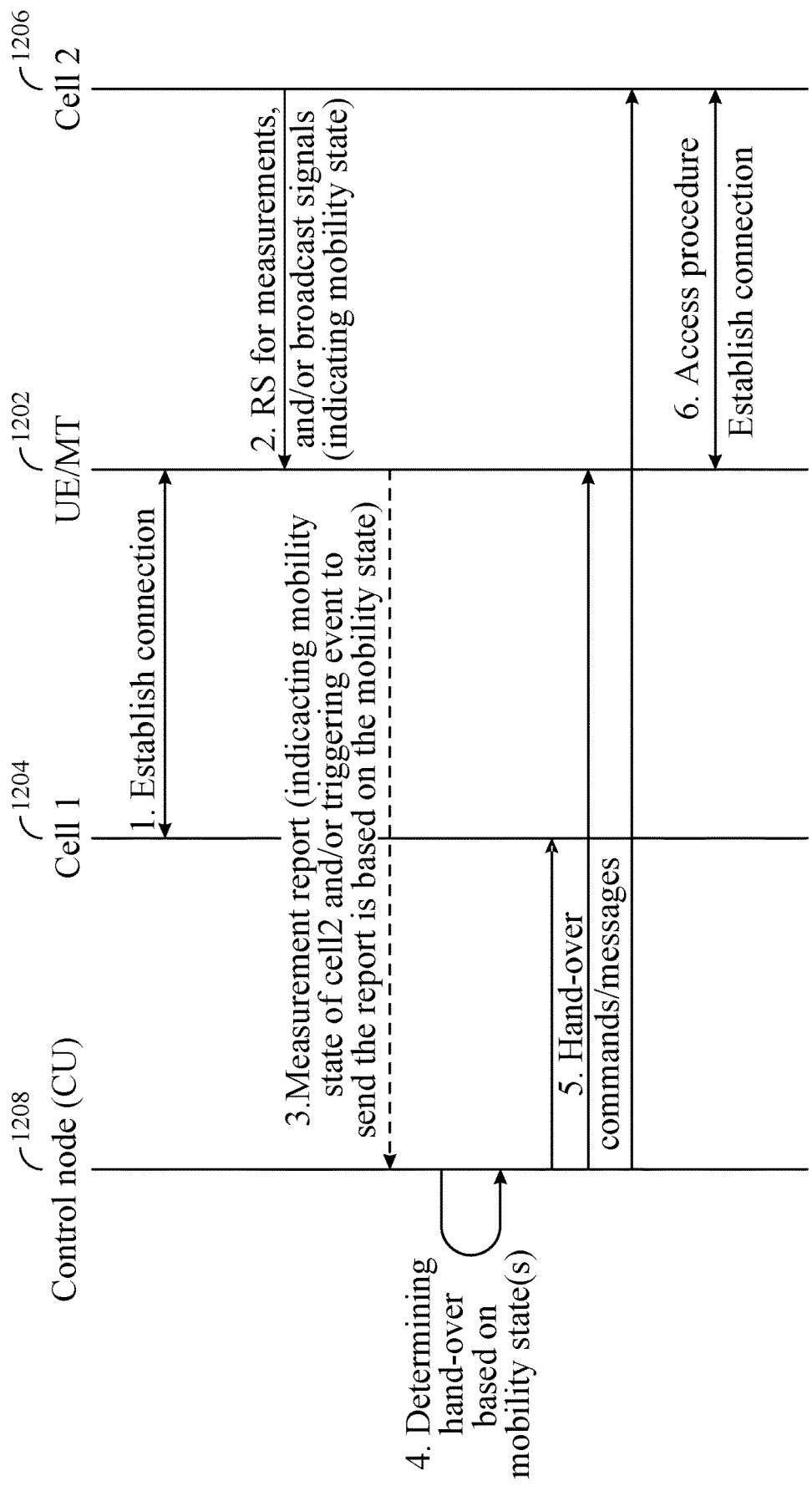
FIG. 12 is a call flow diagram illustrating example operations for mobility-aware access control for cell handover, in accordance with certain aspects of the present disclosure.

FIG. 12 is a call flow diagram illustrating example operations for mobility-aware access control for cell handover, in accordance with certain aspects of the present disclosure. The example operations illustrated in FIG. 12 provide a more-detailed illustration of operations 1000 and operations 1100 illustrated in FIG. 10 and FIG. 11, respectively.

As illustrated, at step 1 in FIG. 12, a first wireless device 1202 (e.g., UE 120 and/or MT of an IAB node 410) may establish a connection and camp on a first cell 1204.

At step 2, the connected first wireless device 1202 may have (or acquire) information about a mobility state of a neighboring cell, such as the second cell 1206. For example, in some cases, at step 2, the first wireless device 1202 may receive one or more signals from a second cell 1206. According to aspects, the first wireless device 1202 may perform one or more measurements on the one or more signals received from the second cell 1206. As noted above, in some cases, the one or more signals may comprise at least one of a synchronization signal block (SSB), a physical broadcast channel (PBCH) signal, a remaining system information (RMSI) signal.

Additionally, the first wireless device 1202 may determine a mobility state corresponding to the second cell 1206 based on the one or more signals received from the second cell 1206. For example, in some cases, the one or more signals may provide an indication of mobility state information corresponding to the second cell 1206 in the network. In this case, the first wireless device 1202 may determine the mobility state information based at least in part on the indication of the mobility state information corresponding to the second cell 1206 in the network.

At step 3, the first wireless device 1202 may transmit a measurement report to a network node 1208 based, at least in part, on the one or more signals from the second cell 1206 and the mobility state information corresponding to the second cell 1206. In some cases, as illustrated, the network node 1208 may be a CU, which, in some cases, may be part of the first cell 1204. In some cases, the measurement report includes an indication of the determined mobility state corresponding to the second cell 1206.

Additionally, in some cases, the first wireless device 1202 may determine whether to transmit the measurement report based on a triggering event. In some cases, the triggering event may be based on the mobility state information corresponding to the second cell 1206. In other words, the first wireless device 1202 may determine whether to transmit a measurement report to the network node 1208 corresponding to the second cell 1206 based on the mobility state corresponding to the second cell 1206 (e.g., and whether the mobility state corresponding to the second cell meets the triggering event). For example, in some cases, if the first wireless device 1202 determines that the mobility state corresponding to the second cell 1206 meets the triggering event (e.g., a mobility state of the second cell 1206 is "mobile" and a measured RSRP of the second cell 1206 is greater than a threshold RSRP), the first wireless device 1202 may decide to transmit the measurement report to the network node 1208. However, if the first wireless device 1202 determines that the mobility state corresponding to the second cell 1206 does not meet a triggering event, the first wireless device 1202 may decide not to transmit the measurement report to the network node 1208. According to aspects, determining whether to transmit a measurement report based on mobility state information corresponding to the second cell 1206 may allow the first wireless device 1202 to conserve time and energy by not having to report measurements for cells that are not suitable (e.g., cells that do not meet the triggering event).

From the perspective of the network node 1208 (e.g., CU), at step 3, the network node 1208 may receive the measurement report from the first wireless device 1202 that is camping on a first cell 1204 in the network. As noted, the measurement report may be based (and carry information regarding measurements for) on one or more signals from a second cell 1206 in the network. Additionally, in some cases, the network node 1208 may receive an indication of mobility state information corresponding to the second cell 1206 from the first wireless device 1202. In some cases, the mobility state information corresponding to the second cell 1206 is received in the measurement report.

At step 4, after receiving the measurement report from the first wireless device 1202, the network node 1208 may determine whether to initiate a handover procedure to hand the first wireless device 1202 over to the second cell 1206 based, at least in part, on mobility state information corresponding to the second cell 1206. In some cases, determining whether to initiate a handover procedure to hand the first wireless device 1202 over to second cell 1206 may be based, at least in part, on one or more conditions related to the mobility state corresponding to the second cell 1206, for example, as discussed above. Further, according to aspects, determining whether to initiate the handover procedure may involve determining to initiate the handover procedure when, for example, the mobility state information corresponding to the second cell 1206 satisfies the one or more conditions. Similarly, determining whether to initiate the handover procedure may involve determining not to initiate the handover procedure when, for example, the mobility state information corresponding to the second cell 1206 does not satisfy the one or more conditions.

According to aspects, at step 5, the network node 1208 may take one or more actions based on the determination of whether to initiate the handover procedure. For example, if the network node 1208 determines to initiate the handover procedure, the network node 1208 may, as illustrated, transmit a handover command to hand over the first wireless device 1202 to the second cell 1206 in the network. According to aspects, the handover command may be transmitted to at least one of the first wireless device 1202 or the second cell 1206.

Thus, at step 5, the first wireless device 1202 may receive a handover command to hand over to the second cell 1206 in the network based, at least in part, on at least one of the measurement report or the mobility state information corresponding to the second cell 1206.

Thereafter, at step 6, the first wireless device 1202 may take one or more actions based on the handover command. For example, as illustrated at step 6, the first wireless device 1202 may perform an access procedure and establish a connection with the second cell 1206. According to aspects, if the network node 1208 decides not to initiate the handover procedure and the first wireless device 1202 does not receive a handover command, the first wireless device 1202 may begin searching for other suitable neighbor cells to handover to, repeating the operations illustrated in FIG. 12.

In some cases, a handover command may be conditional. For example, in some cases, instead of the first wireless device providing the network node a measurement report, in some cases, the network node may provide the first wireless device with a conditional handover command that allows the first wireless device to initiate a handover when certain conditions are satisfied. For example, in some cases, the conditional handover command may include one or more conditions related to a mobility state corresponding to a second cell that the first wireless device wants to be handed over to. According to aspects, if the mobility state corresponding to the second cell satisfies one or more of the conditions in the conditional handover command, the first wireless device may initiate a handover to the second cell.

Figure 13:
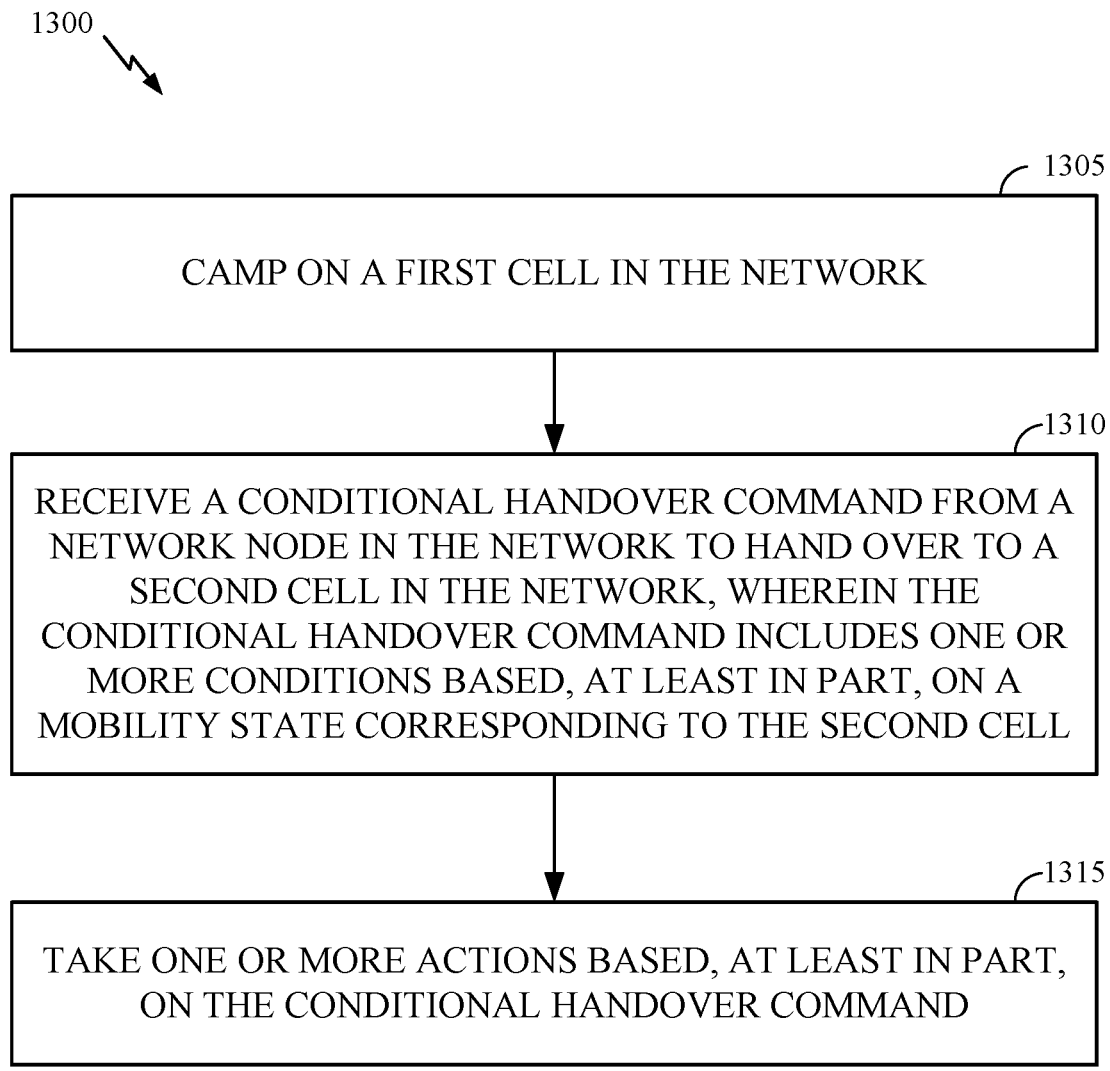
FIG. 13 is a flow diagram illustrating example operations for wireless communication in a network for mobility-aware access control for cell hand over according to a conditional handover command, in accordance with certain aspects of the present disclosure.

FIG. 13 is a flow diagram illustrating example operations 1300 for wireless communication in a network, for example, for mobility-aware access control for cell hand over according to a conditional handover command, in accordance with certain aspects of the present disclosure. The operations 1300 may be performed, for example, by a first wireless device, such as a user equipment (e.g., UE 120) and/or a mobile termination component (MT) of an IAB node 410. Operations 1300 may be implemented as software components that are executed and run on one or more processors (e.g., controller/processor 240 or controller/processor 280 of FIG. 2). Further, the transmission and reception of signals by the network node in operations 1300 may be enabled, for example, by one or more antennas (e.g., antennas 234, 252 of FIG. 2). In certain aspects, the transmission and/or reception of signals by the network may be implemented via a bus interface of one or more processors (e.g., controller/processor 240 or controller/processor 280) obtaining and/or outputting signals.

The operations 1300 may begin, at 1305, by camping on a first cell in the network.

At 1310, the first wireless device receives a conditional handover command from a network node in the network to hand over to a second cell in the network, wherein the conditional handover command includes one or more conditions based, at least in part, on a mobility state corresponding to the second cell.

At 1315, the first wireless device takes one or more actions based, at least in part, on the conditional handover command.

Figure 14:
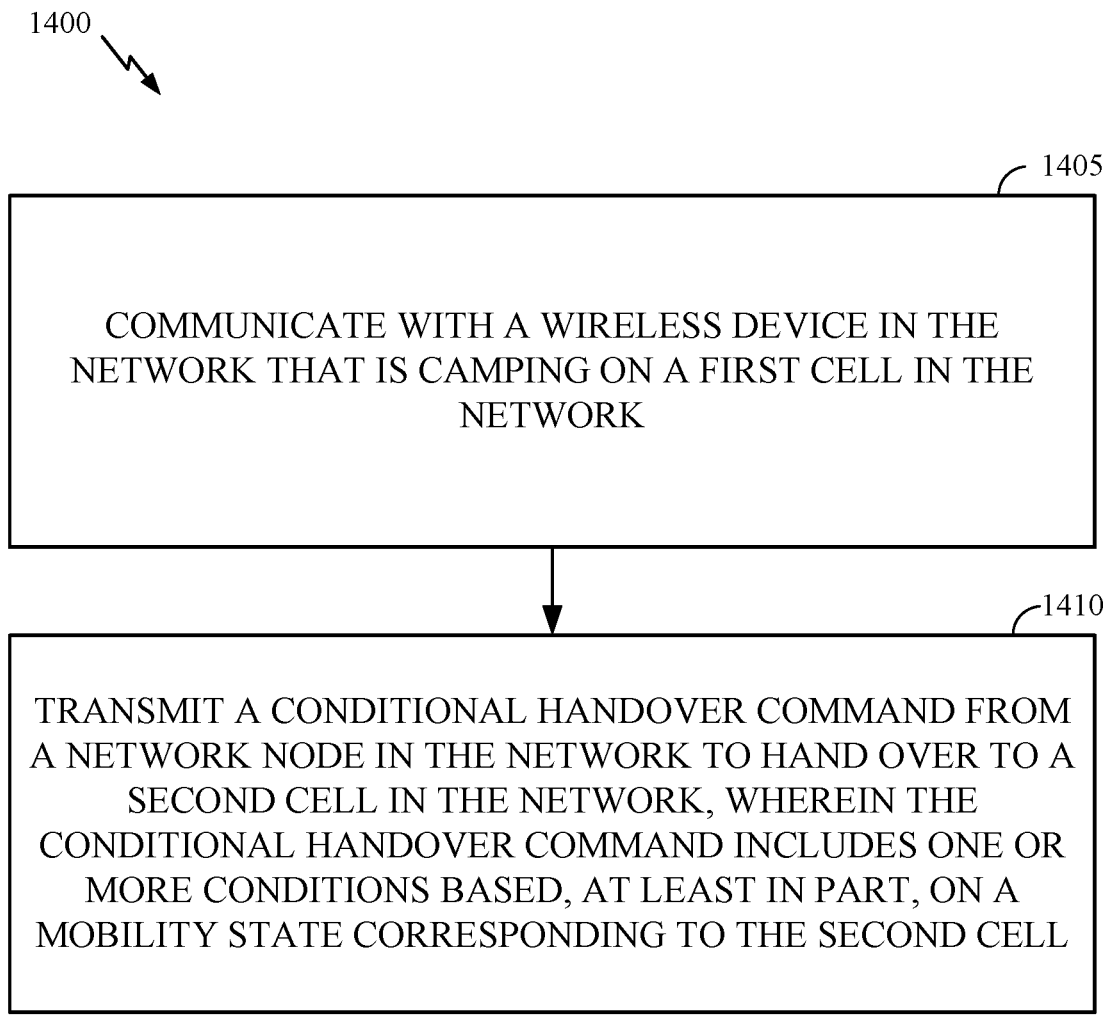
FIG. 14 is a flow diagram illustrating example operations for wireless communication in a network for mobility-aware access control for cell hand over according to a conditional handover command, in accordance with certain aspects of the present disclosure.

FIG. 14 is a flow diagram illustrating example operations 1400 for wireless communication in a network, for example, for mobility-aware access control for cell hand over according to a conditional handover command, in accordance with certain aspects of the present disclosure. The operations 1400 may be performed, for example, by a network node, such as CU of a IAB donor 405. Operations 1400 may be considered complimentary to operations 1300 performed by a UE 120 and/or MT of an IAB node 410.

Operations 1400 may be implemented as software components that are executed and run on one or more processors (e.g., controller/processor 240). Further, the transmission and reception of signals by the network node in operations 1400 may be enabled, for example, by one or more antennas (e.g., antennas 234 of FIG. 2). In certain aspects, the transmission and/or reception of signals by the network may be implemented via a bus interface of one or more processors (e.g., controller/processor 240) obtaining and/or outputting signals.

The operations 1400 may begin, at 1405, by communicating with a wireless device in the network that is camping on a first cell in the network.

At 1110, the network node transmits a conditional handover command from a network node in the network to hand over to a second cell in the network, wherein the conditional handover command includes one or more conditions based, at least in part, on a mobility state corresponding to the second network.

Figure 15:
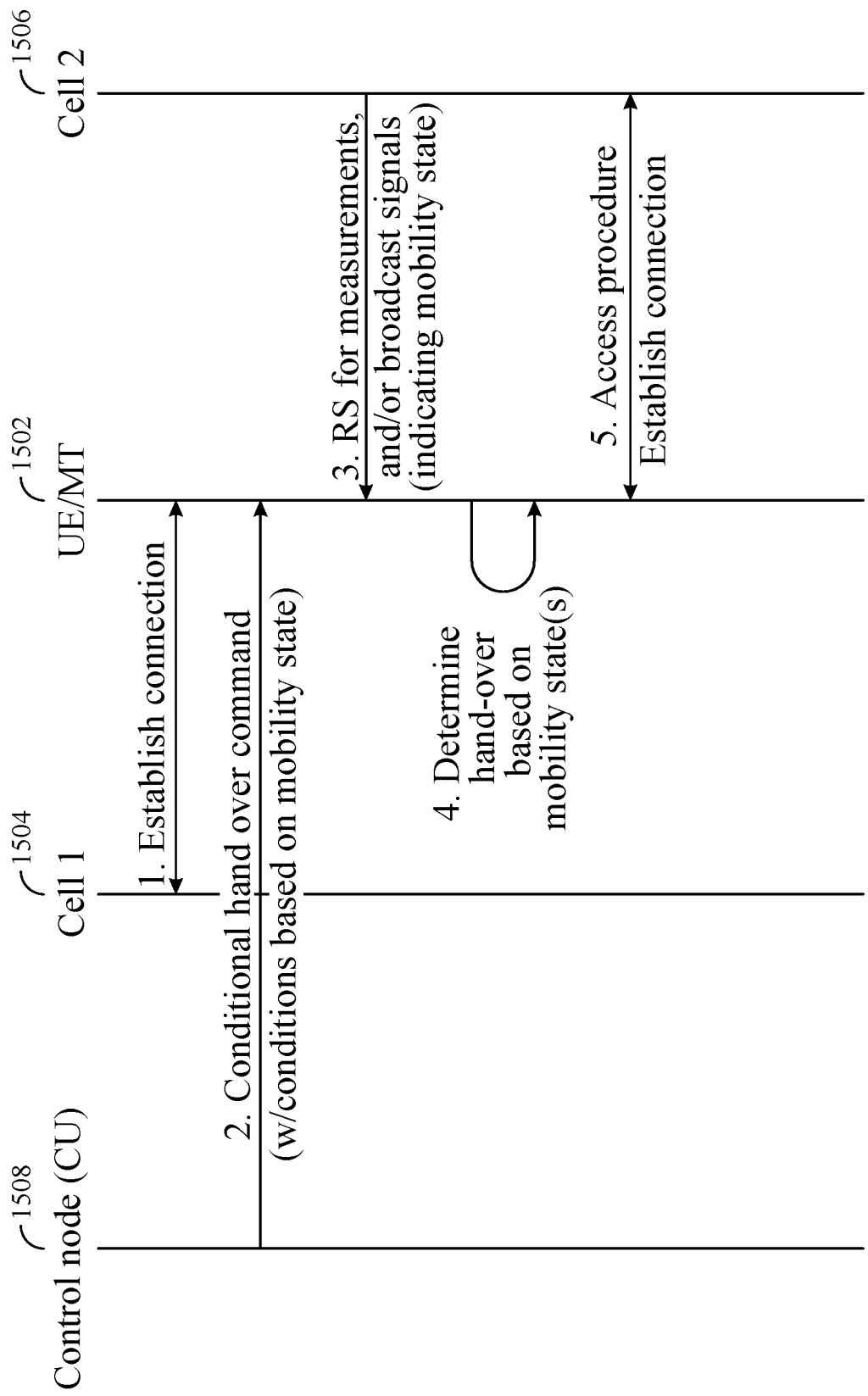
FIG. 15 is a call flow diagram illustrating example operations for mobility-aware access control for cell handover according to a conditional handover command, in accordance with certain aspects of the present disclosure.

FIG. 15 is a call flow diagram illustrating example operations for mobility-aware access control for cell handover according to a conditional handover command. The example operations illustrated in FIG. 15 provide a more-detailed illustration of operations 1300 and operations 1400 illustrated in FIG. 13 and FIG. 14, respectively.

As illustrated, at step 1 if FIG. 15, a first wireless device 1502 (e.g., UE 120 and/or MT of an IAB node 410) may establish a connection and camp on a first cell 1504.

At step 2, the first wireless device 1502 may receive, from a network node 1508 in the network, such as a CU, a conditional handover command to hand over to a second cell 1506 in the network. In some cases, the conditional handover command includes one or more conditions that are based, at least in part, on a mobility state corresponding to the second cell 1506. In other words, the conditional handover may include one or more conditions related to a mobility state corresponding to a second cell 1206 that the first wireless device 1202 wants to be handed over to.

According to aspects, while not illustrated in FIG. 15, in some cases, the conditional handover command may be based, at least in part, on prior measurement information or prior location information associated with at least one of the first wireless device 1502 or the second cell 1506. For example, in some cases, the network node 1508 may receive measurement information or location information corresponding to one or more cells in the network (e.g., the second cell 1506) at some time in the past, as described above. Based on this prior information, the network node 1508 may generate and transmit the conditional handover command to the first wireless device 1502 with one or more conditions based on the prior information corresponding to the one or more cells (e.g., the second cell 1506).

At step 3, the first wireless device 1502 may take one or more actions based on the conditional handover command. For example, in some cases, the first wireless device 1502 may receive one or more signals from the second cell 1506 and determine based on the one or more signals, a mobility state corresponding to the second cell 1506.

Additionally, in some cases, taking one or more actions may include deciding whether or not to handover to the second cell 1506 based at least in part on the one or one or more signals and the one or more conditions in the conditional handover command. In some cases, deciding whether or not to handover to the second cell 1506 may include, for example, initiating a handover procedure to hand over to the second cell 1506 if the one or more conditions are satisfied based at least in part on the one or more signals. For example, in some cases, if the first wireless device 1502 determines that the determined mobility state information corresponding to the second cell 1506 satisfies one or more of the conditions in the conditional handover command, the first wireless device 1502 may decide to initiate a handover procedure to hand over to the second cell 1506. Additionally, deciding whether or not to handover to the second cell 1506 may, in some cases, include deciding not to hand over to the second cell 1506 if the one or more conditions are not satisfied based at least in part on the one or more signals. For example, if the first wireless device 1502 determines that the determined mobility state information corresponding to the second cell 1506 does not satisfy one or more of the conditions in the conditional handover command, the first wireless device 1502 may decide not to initiate a handover procedure to hand over to the second cell 1506.

At step 5, if the first wireless device 1502 decides to handover to the second cell 1506, the first wireless device 1502 may take one or more actions, such as performing an access procedure and establishing a connection with the second cell 1506.

Additionally, while not illustrated, if the first wireless device 1502 is handed over to the second cell 1506, the network node 1508 may receive an indication that the first wireless device 1502 has been handed over to the second cell 1506, for example, based on the conditional handover command. In some cases, the indication that the first wireless device 1502 has been handed over to the second cell 1506 may be received from at least one of the second cell 1506 or the first wireless device 1502.

Figure 16:
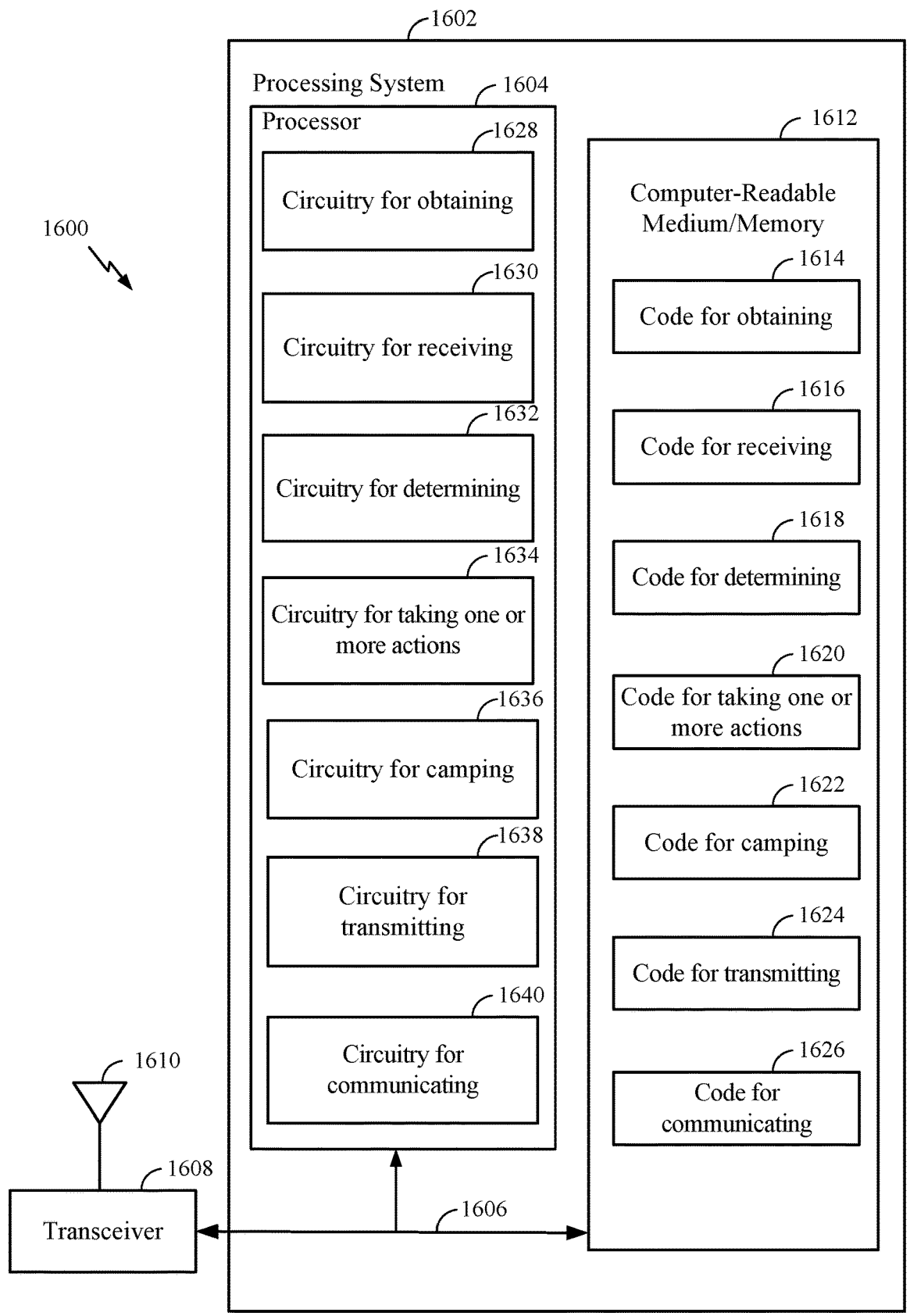
FIG. 16 illustrates a communications device that may include various components configured to perform operations for the techniques disclosed herein in accordance with aspects of the present disclosure.

FIG. 16 illustrates a communications device 1600 that may include various components (e.g., corresponding to means-plus-function components) configured to perform operations for the techniques disclosed herein, such as the operations illustrated in FIGS. 5-15, as well as other techniques described herein for mobility-aware access control. The communications device 1600 includes a processing system 1602 coupled to a transceiver 1608. The transceiver 1608 is configured to transmit and receive signals for the communications device 1600 via an antenna 1610, such as the various signals as described herein. The processing system 1602 may be configured to perform processing functions for the communications device 1600, including processing signals received and/or to be transmitted by the communications device 1600.

The processing system 1602 includes a processor 1604 coupled to a computer-readable medium/memory 1612 via a bus 1606. In certain aspects, the computer-readable medium/memory 1612 is configured to store instructions (e.g., computer-executable code) that when executed by the processor 1604, cause the processor 1604 to perform the operations illustrated in FIGS. 5-15, or other operations for performing the various techniques discussed herein for mobility-aware access control. In certain aspects, computer-readable medium/memory 1612 stores code for performing the operations illustrated in FIGS. 5-15, as well as other techniques described herein for mobility-aware access control. For example, computer-readable medium/memory 1612 stores code 1614 for obtaining; code 1616 for receiving; code 1618 for determining; code 1620 for taking one or more actions; code 1622 for camping; code 1624 for transmitting; and code 1626 for communicating.

In certain aspects, the processor 1604 may include circuitry configured to implement the code stored in the computer-readable medium/memory 1612, such as for performing the operations illustrated in FIGS. 5-15, as well as other techniques described herein for mobility-aware access control. For example, the processor 1604 includes circuitry 1628 for obtaining; circuitry 1630 for receiving; circuitry 1632 for determining; circuitry 1634 for taking one or more actions; circuitry 1636 for camping; circuitry 1638 for transmitting; and circuitry 1640 for communicating.

The techniques described herein may be used for various wireless communication technologies, such as NR (e.g., 5G NR), 3GPP Long Term Evolution (LTE), LTE-Advanced (LTE-A), code division multiple access (CDMA), time division multiple access (TDMA), frequency division multiple access (FDMA), orthogonal frequency division multiple access (OFDMA), single-carrier frequency division multiple access (SC-FDMA), time division synchronous code division multiple access (TD-SCDMA), and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS). LTE and LTE-A are releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). NR is an emerging wireless communications technology under development.

The techniques described herein may be used for the wireless networks and radio technologies mentioned above as well as other wireless networks and radio technologies. For clarity, while aspects may be described herein using terminology commonly associated with 3G, 4G, and/or 5G wireless technologies, aspects of the present disclosure can be applied in other generation-based communication systems.

In 3GPP, the term "cell" can refer to a coverage area of a Node B (NB) and/or a NB subsystem serving this coverage area, depending on the context in which the term is used. In NR systems, the term "cell" and BS, next generation NodeB (gNB or gNodeB), access point (AP), distributed unit (DU), carrier, or transmission reception point (TRP) may be used interchangeably. A BS may provide communication coverage for a macro cell, a pico cell, a femto cell, and/or other types of cells. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having an association with the femto cell (e.g., UEs in a Closed Subscriber Group (CSG), UEs for users in the home, etc.). A BS for a macro cell may be referred to as a macro BS. A BS for a pico cell may be referred to as a pico BS. A BS for a femto cell may be referred to as a femto BS or a home BS.

A UE may also be referred to as a mobile station, a terminal, an access terminal, a subscriber unit, a station, a Customer Premises Equipment (CPE), a cellular phone, a smart phone, a personal digital assistant (PDA), a wireless modem, a wireless communication device, a handheld device, a laptop computer, a cordless phone, a wireless local loop (WLL) station, a tablet computer, a camera, a gaming device, a netbook, a smartbook, an ultrabook, an appliance, a medical device or medical equipment, a biometric sensor/device, a wearable device such as a smart watch, smart clothing, smart glasses, a smart wrist band, smart jewelry (e.g., a smart ring, a smart bracelet, etc.), an entertainment device (e.g., a music device, a video device, a satellite radio, etc.), a vehicular component or sensor, a smart meter/sensor, industrial manufacturing equipment, a global positioning system device, or any other suitable device that is configured to communicate via a wireless or wired medium. Some UEs may be considered machine-type communication (MTC) devices or evolved MTC (eMTC) devices. MTC and eMTC UEs include, for example, robots, drones, remote devices, sensors, meters, monitors, location tags, etc., that may communicate with a BS, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, which may be narrowband IoT (NB-IoT) devices.

Certain wireless networks (e.g., LTE) utilize orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kHz and the minimum resource allocation (called a "resource block" (RB)) may be 12 subcarriers (or 180 kHz). Consequently, the nominal Fast Fourier Transfer (FFT) size may be equal to 128, 256, 512, 1024 or 2048 for system bandwidth of 1.25, 2.5, 5, 10, or 20 megahertz (MHz), respectively. The system bandwidth may also be partitioned into subbands. For example, a subband may cover 1.08 MHz (e.g., 6 RBs), and there may be 1, 2, 4, 8, or 16 subbands for system bandwidth of 1.25, 2.5, 5, 10 or 20 MHz, respectively. In LTE, the basic transmission time interval (TTI) or packet duration is the 1 ms subframe.

NR may utilize OFDM with a CP on the uplink and downlink and include support for half-duplex operation using TDD. In NR, a subframe is still 1 ms, but the basic TTI is referred to as a slot. A subframe contains a variable number of slots (e.g., 1, 2, 4, 8, 16, . . . slots) depending on the subcarrier spacing. The NR RB is 12 consecutive frequency subcarriers. NR may support a base subcarrier spacing of 15 KHz and other subcarrier spacing may be defined with respect to the base subcarrier spacing, for example, 30 kHz, 60 kHz, 120 kHz, 240 kHz, etc. The symbol and slot lengths scale with the subcarrier spacing. The CP length also depends on the subcarrier spacing. Beamforming may be supported and beam direction may be dynamically configured. MIMO transmissions with precoding may also be supported. In some examples, MIMO configurations in the DL may support up to 8 transmit antennas with multi-layer DL transmissions up to 8 streams and up to 2 streams per UE. In some examples, multi-layer transmissions with up to 2 streams per UE may be supported. Aggregation of multiple cells may be supported with up to 8 serving cells.

In some examples, access to the air interface may be scheduled. A scheduling entity (e.g., a BS) allocates resources for communication among some or all devices and equipment within its service area or cell. The scheduling entity may be responsible for scheduling, assigning, reconfiguring, and releasing resources for one or more subordinate entities. That is, for scheduled communication, subordinate entities utilize resources allocated by the scheduling entity. Base stations are not the only entities that may function as a scheduling entity. In some examples, a UE may function as a scheduling entity and may schedule resources for one or more subordinate entities (e.g., one or more other UEs), and the other UEs may utilize the resources scheduled by the UE for wireless communication. In some examples, a UE may function as a scheduling entity in a peer-to-peer (P2P) network, and/or in a mesh network. In a mesh network example, UEs may communicate directly with one another in addition to communicating with a scheduling entity.

In some examples, two or more subordinate entities (e.g., UEs) may communicate with each other using sidelink signals. Real-world applications of such sidelink communications may include public safety, proximity services, UE-to-network relaying, vehicle-to-vehicle (V2V) communications, Internet of Everything (IoE) communications, IoT communications, mission-critical mesh, and/or various other suitable applications. Generally, a sidelink signal may refer to a signal communicated from one subordinate entity (e.g., UE1) to another subordinate entity (e.g., UE2) without relaying that communication through the scheduling entity (e.g., UE or BS), even though the scheduling entity may be utilized for scheduling and/or control purposes. In some examples, the sidelink signals may be communicated using a licensed spectrum (unlike wireless local area networks, which typically use an unlicensed spectrum).

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

The various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user equipment 120 (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein, for example, instructions for performing the operations described herein and illustrated in FIGS. 5-15, as well as other techniques described herein for mobility-aware access control.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

The invention claimed is:

1. A method of wireless communication performed by a network node in a network, comprising:
    obtaining first mobility state information corresponding to a first cell and third mobility state information corresponding to a wireless device in the network;
    determining whether to initiate a handover procedure to hand over the wireless device from the first cell to a second cell based on the first mobility state information, the third mobility state information, and a first signal strength between the wireless device and the first cell being weaker than a second signal strength between the wireless device and the second cell, wherein determining whether to initiate the handover procedure comprises determining, based on the first mobility state information, the third mobility state information, and the first signal strength being weaker than the second signal strength, that the first cell is suitable for the wireless device; and
    performing one or more actions based on the determination that the first cell is suitable for the wireless device, wherein performing the one or more actions comprises determining not to initiate the handover procedure to hand over the wireless device from the first cell to the second cell based on the determination that the first cell is suitable for the wireless device.

2. The method of claim 1, further comprising receiving a measurement report from the wireless device, wherein the measurement report includes measurement information associated with the second cell, wherein obtaining the first mobility state information and the third mobility state information comprises:
    inferring the first mobility state information based on prior measurement information or prior location information associated with the first cell; and
    inferring the third mobility state information based on prior measurement information or prior location information associated with the wireless device.

3. The method of claim 1, wherein:
    the network node comprises a control unit of an integrated access and backhaul (IAB) node; and
    the wireless device comprises one of:
        a user equipment (UE); or
        a mobile termination component (MT) of an integrated access and backhaul (TAB) node.

4. The method of claim 1, wherein:
    mobility state information provides an indication of at least one of:
        a level of mobility comprising one of stationary mobility, low-speed mobility, medium-speed mobility, or high-speed mobility; or
        a change or transition from one mobility state to another.

5. The method of claim 1, further comprising receiving a measurement report from the wireless device, wherein the measurement report includes measurement information associated with the second cell, wherein the measurement report includes an indication of second mobility state information corresponding to the second cell.

6. The method of claim 5, wherein determining whether to initiate the handover procedure comprises determining whether to initiate the handover procedure based on one or more conditions related to the second mobility state information corresponding to the second cell.

7. A network node, comprising:
    a memory; and
    a processor coupled to the memory, wherein the processor is configured to:
        obtain first mobility state information corresponding to a first cell and third mobility state information corresponding to a wireless device in a network;
        determine whether to initiate a handover procedure to hand over the wireless device from the first cell to a second cell based on the first mobility state information, the third mobility state information, and a first signal strength between the wireless device and the first cell being weaker than a second signal strength between the wireless device and the second cell; and
        perform one or more actions based on the determination, wherein:
            to determine whether to initiate the handover procedure, the processor is configured to determine, based on the first mobility state information, the third mobility state information, and the first signal strength being weaker than the second signal strength, that the first cell is suitable for the wireless device; and
            to perform the one or more actions comprises, the processor is configured to determine not to initiate the handover procedure to hand over the wireless device from the first cell to the second cell based on the determination that the first cell is suitable for the wireless device.

8. The network node of claim 7, wherein:
    the processor is configured to receive a measurement report from the wireless device, the measurement report including measurement information associated with the second cell; and
    to obtain at least one of the first mobility state information and the third mobility state information, the processor is configured to:
        infer the first mobility state information based on prior measurement information or prior location information associated with the first cell; and
        infer the third mobility state information based on prior measurement information or prior location information associated with the wireless device.

9. The network node of claim 7, wherein:
    the network node comprises a control unit of an integrated access and backhaul (IAB) node; and
    the wireless device comprises one of:
        a user equipment (UE); or
        a mobile termination component (MT) of an integrated access and backhaul (TAB) node.

10. The network node of claim 7, wherein:
    mobility state information provides an indication of at least one of:
        a level of mobility comprising one of stationary mobility, low-speed mobility, medium-speed mobility, or high-speed mobility; or
        a change or transition from one mobility state to another.

11. The network node of claim 7, wherein:
    the processor is configured to receive a measurement report from the wireless device, the measurement report including measurement information associated with the second cell; and
    the measurement report includes an indication of second mobility state information corresponding to the second cell.

12. The network node of claim 11, wherein, to determine whether to initiate the handover procedure, the processor is configured to determine whether to initiate the handover procedure based on one or more conditions related to the second mobility state information corresponding to the second cell.

13. A non-transitory computer-readable medium, comprising:
instructions that, when executed by a processor of a network node, cause the network node to:
obtain first mobility state information corresponding to a first cell and third mobility state information corresponding to a wireless device in a network;
determine whether to initiate a handover procedure to hand over the wireless device from the first cell to a second cell based on the first mobility state information, the third mobility state information, and a first signal strength between the wireless device and the first cell being weaker than a second signal strength between the wireless device and the second cell; and
perform one or more actions based on the determination, wherein:
to determine whether to initiate the handover procedure, the instructions cause the network node to determine, based on the first mobility state information, the third mobility state information, and the first signal strength being weaker than the second signal strength, that the first cell is suitable for the wireless device; and
to perform the one or more actions comprise, the instructions cause the network node to determine not to initiate the handover procedure to hand over the wireless device from the first cell to the second cell based on the determination that the first cell is suitable for the wireless device.

14. The non-transitory computer-readable medium of claim 13, wherein:
the instructions further cause the network node to receive a measurement report from the wireless device, the measurement report including measurement information associated with the second cell; and
to obtain at least one of the first mobility state information and third mobility state information, the instructions cause the network node to:
infer the first mobility state information based on prior measurement information or prior location information associated with the first cell; and
infer the third mobility state information based on prior measurement information or prior location information associated with the wireless device.

15. The non-transitory computer-readable medium of claim 13, wherein:
the network node comprises a control unit of an integrated access and backhaul (IAB) node; and
the wireless device comprises one of:
a user equipment (UE); or
a mobile termination component (MT) of an integrated access and backhaul (TAB) node.

16. The non-transitory computer-readable medium of claim 13, wherein:
mobility state information provides an indication of at least one of:
a level of mobility comprising one of stationary mobility, low-speed mobility, medium-speed mobility, or high-speed mobility; or
a change or transition from one mobility state to another.

17. The non-transitory computer-readable medium of claim 13, wherein:
the instructions further cause the network node to receive a measurement report from the wireless device, the measurement report including measurement information associated with the second cell; and
the measurement report includes an indication of second mobility state information corresponding to the second cell.

18. The non-transitory computer-readable medium of claim 17, wherein the instructions further cause the network node to determine whether to initiate the handover procedure based on one or more conditions related to the second mobility state information corresponding to the second cell.

19. A network node for wireless communication, comprising:
means for obtaining first mobility state information corresponding to a first cell and third mobility state information corresponding to a wireless device in a network;
means for determining whether to initiate a handover procedure to hand over the wireless device from the first cell to a second cell based on the first mobility state information, the third mobility state information, and a first signal strength between the wireless device and the first cell being weaker than a second signal strength between the wireless device and the second cell, wherein the means for determining whether to initiate a handover procedure further comprise means for determining, based on the first mobility state information, the third mobility state information, and the first signal strength being weaker than the second signal strength, that the first cell is suitable for the wireless device; and
means for performing one or more actions based on the determination, wherein the means for performing the one or more actions comprise means for determining not to initiate the handover procedure to hand over the wireless device from the first cell to the second cell based on the determination that the first cell is suitable for the wireless device.

20. The network node of claim 19, further comprising means for receiving a measurement report from the wireless device, the measurement report including measurement information associated with the second cell, wherein:
the means for obtaining the first mobility state information and the third mobility state information comprises:
means for inferring the first mobility state information based on prior measurement information or prior location information associated with the first cell; and
means for inferring the third mobility state information based on prior measurement information or prior location information associated with the wireless device.

21. The network node of claim 19, wherein:
mobility state information provides an indication of at least one of:
a level of mobility comprising one of stationary mobility, low-speed mobility, medium-speed mobility, or high-speed mobility; or
a change or transition from one mobility state to another.

22. The network node of claim 19, further comprising means for receiving a measurement report from the wireless device, wherein the measurement report includes measurement information associated with the second cell, wherein:

the measurement report includes an indication of second mobility state information corresponding to the second cell.

23. The network node of claim 22, wherein the means for determining whether to initiate the handover procedure comprises means for determining whether to initiate the handover procedure based on one or more conditions related to the second mobility state information corresponding to the second cell.

\* \* \* \* \*